US009610925B2

(12) United States Patent
Nomura et al.

(10) Patent No.: US 9,610,925 B2
(45) Date of Patent: Apr. 4, 2017

(54) VEHICLE BEHAVIOR CONTROL SYSTEM

(71) Applicant: NISSIN KOGYO CO., LTD., Ueda, Nagano (JP)

(72) Inventors: Nobuyuki Nomura, Nagano (JP); Takahiro Nishigaki, Nagano (JP); Shinji Murashita, Nagano (JP); Natsuko Hamamoto, Nagano (JP); Kenta Wada, Nagano (JP)

(73) Assignee: AUTOLIV NISSIN BRAKE SYSTEMS JAPAN CO., LTD., Nagano (JP)

( * ) Notice: Subject to any disclaimer, the term of this patent is extended or adjusted under 35 U.S.C. 154(b) by 94 days.

(21) Appl. No.: 14/608,380

(22) Filed: Jan. 29, 2015

(65) Prior Publication Data
US 2015/0217736 A1 Aug. 6, 2015

(30) Foreign Application Priority Data

Feb. 4, 2014 (JP) ................................ 2014-019320

(51) Int. Cl.
*B60T 7/12* (2006.01)
*B60T 8/1755* (2006.01)

(52) U.S. Cl.
CPC ............ *B60T 7/12* (2013.01); *B60T 8/17551* (2013.01); *B60T 2270/30* (2013.01)

(58) Field of Classification Search
None
See application file for complete search history.

(56) References Cited

U.S. PATENT DOCUMENTS

| | | | | |
|---|---|---|---|---|
| 5,863,105 A | * | 1/1999 | Sano | B60T 8/17552 303/140 |
| 6,089,680 A | * | 7/2000 | Yoshioka | B60T 8/1755 303/140 |
| 6,183,052 B1 | * | 2/2001 | Harada | B60T 8/172 303/140 |

(Continued)

FOREIGN PATENT DOCUMENTS

EP 2543564 A1 1/2013
JP 2005-104338 A 4/2005

(Continued)

OTHER PUBLICATIONS

Japanese Office Action for Related Application No. JP2014-019320, dated Dec. 22, 2015, 6 pages.

(Continued)

*Primary Examiner* — Truc M Do
(74) *Attorney, Agent, or Firm* — Andrew M. Calderon; Roberts Mlotkowski Safran Cole & Calderon, P.C.

(57) ABSTRACT

According to one embodiment, there is provided a vehicle behavior control system. The vehicle behavior control system includes a behavior stabilization control module that is configured to execute a behavior stabilization control so as to stabilize a behavior of a vehicle by giving a braking force to a turning outer wheel of the vehicle based on a target braking force. The behavior stabilization control module has a target braking force setting section that sets the target braking force. The target braking force is set so as to be smaller for a second turn than for a first turn.

20 Claims, 16 Drawing Sheets

(56) References Cited

U.S. PATENT DOCUMENTS

| | | | | |
|---|---|---|---|---|
| 6,324,458 B1* | 11/2001 | Takagi | ................... | B60K 28/16 |
| | | | | 180/197 |
| 6,438,474 B1* | 8/2002 | Tanaka | ................. | B60T 8/1755 |
| | | | | 303/140 |
| 7,647,150 B2* | 1/2010 | Katayama | ............. | B60T 8/1755 |
| | | | | 180/422 |
| 7,878,605 B2* | 2/2011 | Kokubo | ................. | B60K 6/445 |
| | | | | 303/151 |
| 8,744,689 B2* | 6/2014 | Yamakado | .......... | B60W 30/045 |
| | | | | 701/44 |
| 2001/0020217 A1* | 9/2001 | Matsuno | ................... | B60T 7/22 |
| | | | | 701/301 |
| 2002/0075139 A1* | 6/2002 | Yamamoto | ............ | B60R 21/013 |
| | | | | 340/436 |
| 2002/0082762 A1* | 6/2002 | Tanaka | ................. | B60T 8/1755 |
| | | | | 701/70 |
| 2002/0087247 A1* | 7/2002 | Tanaka | ................. | B60T 8/1755 |
| | | | | 701/70 |
| 2002/0156580 A1* | 10/2002 | Matsuura | ................ | B60T 7/22 |
| | | | | 701/301 |
| 2004/0135431 A1* | 7/2004 | Sekine | .................... | B60T 7/042 |
| | | | | 303/140 |
| 2006/0015239 A1* | 1/2006 | Higuchi | .................... | B60T 7/12 |
| | | | | 701/72 |
| 2006/0041366 A1* | 2/2006 | Kato | ....................... | B60T 8/171 |
| | | | | 701/72 |
| 2007/0112498 A1* | 5/2007 | Yasutake | ............. | B60T 8/17554 |
| | | | | 701/72 |
| 2008/0221766 A1* | 9/2008 | Maeda | .................. | B60T 8/1755 |
| | | | | 701/70 |
| 2009/0157275 A1* | 6/2009 | Ito | ........................ | B60T 8/17552 |
| | | | | 701/72 |
| 2010/0211269 A1* | 8/2010 | Yasutake | ............... | B60T 8/1755 |
| | | | | 701/42 |
| 2010/0211271 A1* | 8/2010 | Yasutake | ............... | B60T 8/1755 |
| | | | | 701/48 |
| 2011/0210604 A1* | 9/2011 | Yamamoto | .............. | B60T 7/042 |
| | | | | 303/3 |
| 2012/0173111 A1* | 7/2012 | Nagaya | .................. | B60K 28/16 |
| | | | | 701/72 |
| 2012/0212043 A1* | 8/2012 | Miyata | .................... | B60T 7/042 |
| | | | | 303/9.62 |

FOREIGN PATENT DOCUMENTS

| | | |
|---|---|---|
| JP | 2013-086752 A | 5/2005 |
| JP | 2005-271823 A | 10/2005 |
| JP | 2010064720 | 3/2010 |
| JP | 2011-073534 A | 4/2011 |
| JP | 2011102048 | 5/2011 |

OTHER PUBLICATIONS

European Search Report for Related EP Application No. 15153196.9-1756, Dated Jun. 18, 2015, 7 Pages.

* cited by examiner

VEHICLE BEHAVIOR CONTROL SYSTEM

CROSS-REFERENCE TO RELATED APPLICATION(S)

This application claims priority from Japanese Patent Application No. 2014-019320 filed on Feb. 4, 2014, the entire contents of which are incorporated herein by reference.

FIELD

An embodiment described herein generally relates to a vehicle behavior control system that stabilizes the behavior of a vehicle.

BACKGROUND

JP-2010-64720-A discloses a behavior stabilization control system that stabilizes the behavior of a vehicle. Such behavior stabilization control system may restrict an oversteer condition by imparting a braking force to a turning outer wheel while a vehicle is in a condition of a sharp turn.

When a vehicle changes its traveling direction from straight ahead driving as by taking a left turn, a right turn, and then to a left turn alternately, in case the same braking force as that given to a turning outer wheel at the first turn is given to the turning outer wheel at turns from a second turn on, an understeer condition may possibly be brought about.

SUMMARY

One object of the invention is to provide a vehicle behavior control system that can restrict the occurrence of an understeer condition while the behavior of a vehicle is under control by adjusting properly a braking force that is intended to restrict an oversteer condition.

According to an aspect of the invention, there is provided a vehicle behavior control system including:
a behavior stabilization control module configured to execute a behavior stabilization control so as to stabilize a behavior of a vehicle by giving a braking force to a turning outer wheel of the vehicle based on a target braking force,
wherein the behavior stabilization control module has
a target braking force setting section configured to set the target braking force smaller for a second turn than for a first turn, the first turn being a sharp turn occurring first, the second turn being an other sharp turn than the first turn.

According to this configuration, the target braking force can be set smaller for the second turn than for the first turn, and therefore, the occurrence of an understeer condition can be restricted during the vehicle behavior control for the second turn. In other words, the target braking force for the first turn can be made larger than that for the second turn, and therefore, the strong braking force can be given to the turning outer wheel of the vehicle at the sharp turn occurring first, thereby restricting effectively the oversteer condition during the vehicle behavior control for the first turn.

In this invention, the "sharp turn" means a turning condition where the behavior stabilization control is required. The first turn means a first sharp turn which occurs first since a straight ahead driving condition or a moderate turn condition where no behavior stabilization control is executed. The second turn means second and subsequent sharp turns after the first turn.

There may be provided, based on the above configuration, the vehicle behavior control system, further including:
a lateral acceleration obtaining module configured to obtain a lateral acceleration;
a corrected lateral acceleration calculation module configured to calculate a corrected lateral acceleration so as to increase following an increase of an absolute value of the lateral acceleration and so as not to easily decrease in response to a decrease of the absolute value of the lateral acceleration;
a variation calculation module configured to calculate a variation in the corrected lateral acceleration;
a steering angle obtaining module configured to obtain a steering angle;
a vehicle speed obtaining module configured to obtain a vehicle speed; and a standard yaw rate calculation module configured to calculate a standard yaw rate of the vehicle based on the vehicle speed and the steering angle,
wherein the target braking force setting section determines
that the first turn occurs in case the variation in the corrected lateral acceleration is equal to or larger than a first determination threshold when the standard yaw rate exceeds a second determination threshold and the behavior stabilization control is started, and
that the second turn occurs in case the variation in the corrected lateral acceleration is smaller than the first determination threshold when the standard yaw rate exceeds the second determination threshold and the behavior stabilization control is started.

There may be provided, based on the above configuration, the vehicle behavior control system, further including:
a lateral acceleration obtaining module configured to obtain a lateral acceleration;
a corrected lateral acceleration calculation module configured to calculate a corrected lateral acceleration so as to increase following an increase of an absolute value of the lateral acceleration and so as not to easily decrease in response to a decrease of the absolute value of the lateral acceleration;
a steering angle obtaining module configured to obtain a steering angle; and
a turn determination module configured to determine
that the vehicle is turning when the steering angle exceeds a turn determination threshold, and
that that the vehicle is not turning when the steering angle is equal to or smaller than the turn determination threshold,
wherein the target braking force setting section
sets a determination flag from 0 to 1 in case the corrected lateral acceleration changes from a value that is smaller than a third determination threshold to a value that is equal to or larger than the third determination threshold when the turn determination module determines that the vehicle is turning, and
sets the determination flag to 0 in case the flag is 1 when the turn determination module determines that the vehicle is not turning, and
wherein the target braking force setting section determines
that the first turn occurs when the turn determination module determines that the vehicle is turning while the determination flag is set to 1, and
that the second turn occurs when the turn determination module determines that the vehicle is turning while the determination flag is set to 0.

There may be provided, based on the above configuration, the vehicle behavior control system,
wherein the behavior stabilization control module starts the behavior stabilization control more easily for the second turn than for the first turn.

According to this configuration, the behavior stabilization control is made easier to be executed for the second turn in which the behavior of the vehicle tends to be more unstable than in the first turn than for the first turn, and therefore, the behavior of the vehicle can be made more stable.

According to the vehicle behavior control system of the invention, it is possible to restrict the occurrence of an understeer condition during a vehicle behavior control by adjusting properly a braking force that restricts an oversteer condition.

BRIEF DESCRIPTION OF DRAWINGS

FIG. 12A shows changes in steering angle, actual yaw rate and slip angle. FIG. 12B shows changes in brake hydraulic pressures at wheels.

FIG. 13A shows changes in steering angle, actual yaw rate and slip angle. FIG. 13B shows changes in brake hydraulic pressures at wheels.

FIG. 14A shows changes in steering angle, actual yaw rate and lateral acceleration. FIG. 14B shows changes in brake hydraulic pressures at wheels.

FIG. 15A shows changes in steering angle, actual yaw rate and lateral acceleration. FIG. 15B shows changes in brake hydraulic pressures at wheels.

FIG. 15C shows change in control modes.

DETAILED DESCRIPTION

An embodiment will be described with reference to the drawings.

Figure 1:
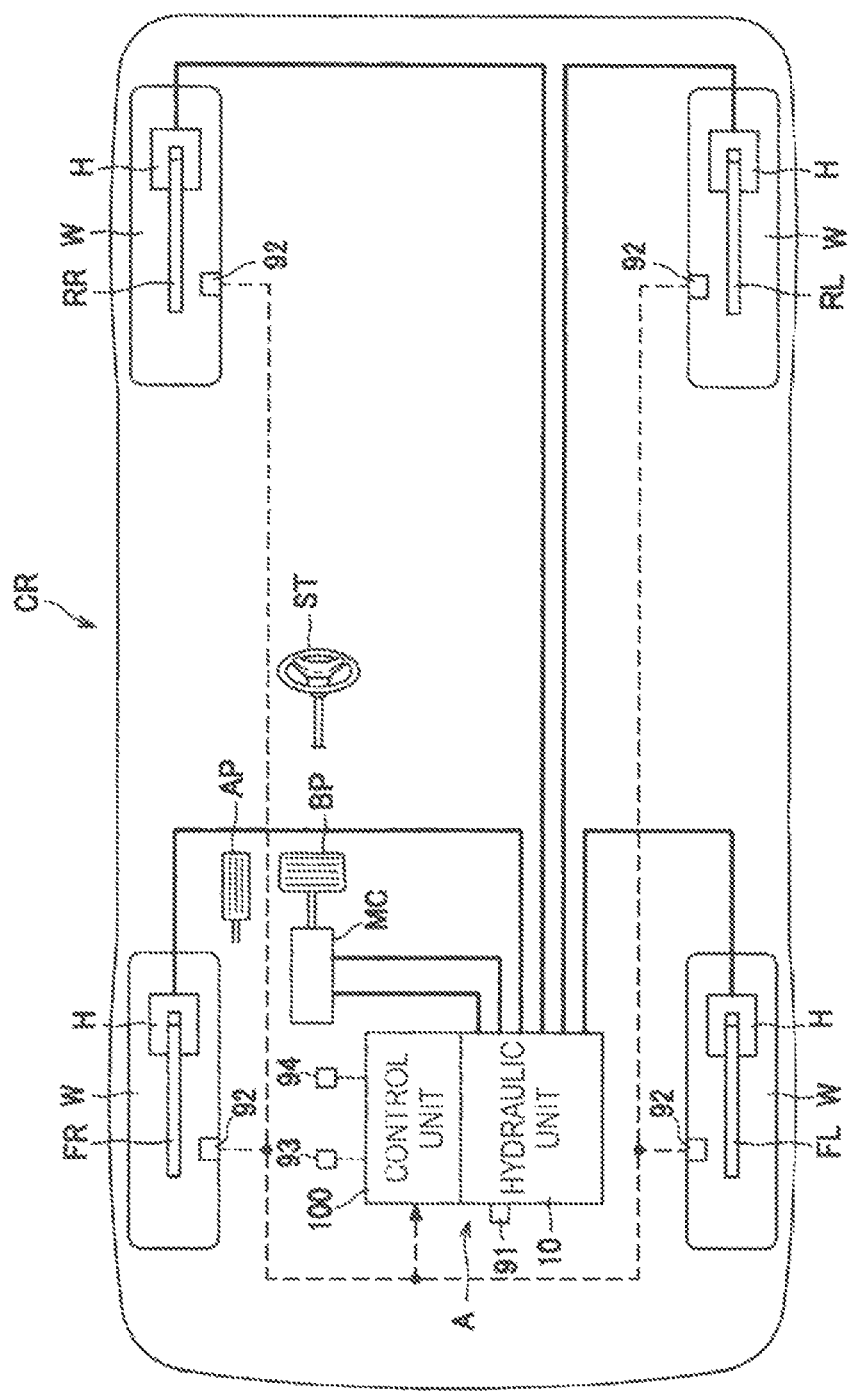
FIG. 1 is a block diagram of a vehicle that includes a vehicle behavior control system according to an embodiment.

As shown in FIG. 1, a vehicle behavior control system A is a system for giving a braking force to each wheel W of a vehicle CR as required. The vehicle behavior control system A includes mainly a hydraulic unit 10 in which fluid lines and various parts are provided and a control unit 100 for controlling the various parts in the hydraulic unit 10 as required.

Wheel brakes FL, RR, RL, FR are provided on the wheels W, and the wheel brakes FL, RR, RL, FR include wheel cylinders H that produces a braking force by a hydraulic pressure that is supplied thereto from a master cylinder MC as a hydraulic pressure source. The master cylinder MC and the wheel cylinders H are both connected to the hydraulic unit 10. A brake hydraulic pressure that is produced in the master cylinder MC according to effort exerted on a brake pedal BP (by a driver who depresses it) is controlled in the control unit 100 and the hydraulic unit 10 to be supplied to the wheel cylinders H.

A pressure sensor 91 for detecting a pressure in the master cylinder MC, wheel speed sensors 92 for detecting wheel speeds of the wheels W, a steering angle sensor 93 for detecting a steering angle θ of a steering wheel ST, and a lateral acceleration sensor 94 for detecting an acceleration that acts sideways on the vehicle CR (a lateral acceleration ΔY) are connected to the control unit 100. This control unit 100 includes, for example, a CPU (Central Processing Unit), a RAM (Random Access Memory), a ROM (Read Only Memory) and an input/output circuit and executes controls by performing various types of arithmetic operations based on inputs from the sensors 91 to 94 and programs or data stored in the ROM. The details of the control unit 100 will be described later.

Figure 2:
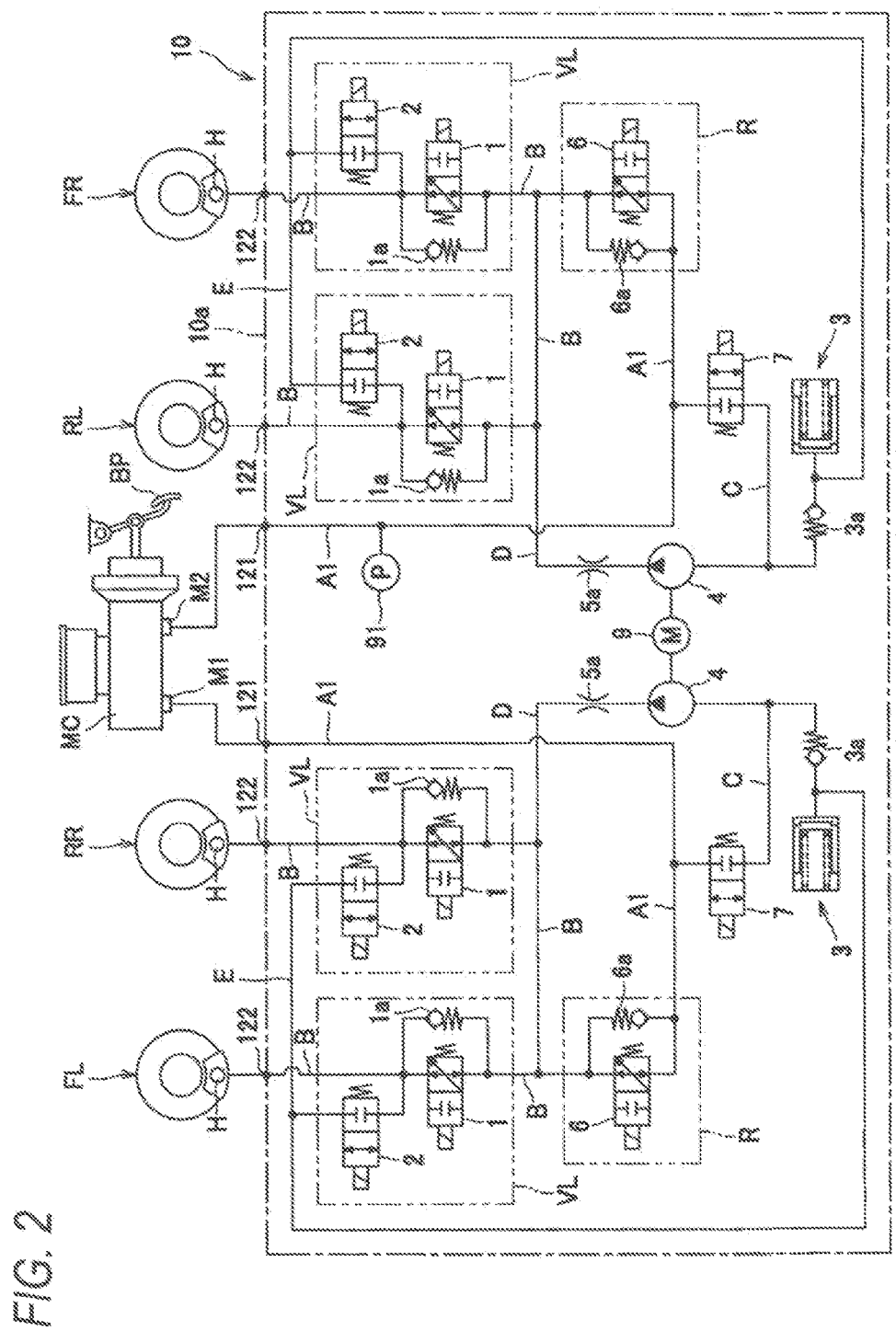
FIG. 2 is a block diagram showing the configuration of a hydraulic unit.

As shown in FIG. 2, the hydraulic unit 10 is disposed between the master cylinder MC that is a hydraulic pressure source that produces a brake hydraulic pressure according to effort applied to the brake pedal BP by the driver and the wheel brakes FR, FL, RR, RL. The hydraulic unit 10 includes a pump body 10a that is a base body having fluid lines (hydraulic pressure lines) through which brake fluid flows and pluralities of inlet valves 1 and outlet valves 2 that are disposed on the fluid lines. Two output ports M1, M2 of the master cylinder MC are connected to inlet ports 121 of the pump body 10a, and outlet ports 122 of the pump body 10a are connected to the corresponding wheel brakes FL, RR, RL, FR. Normally, fluid lines through which the brake fluid under pressure is passed on are formed to extend from the inlet ports 121 to the outlet ports 122 within the pump body 10a, whereby pedal effort exerted on the brake pedal BP is transmitted individually to the wheel brakes FL, RR, RL, FR.

The fluid line that initiates from the output port M1 communicates with the wheel brake FL of the left front wheel and the wheel brake RR of the right rear wheel. The fluid line that initiates from the output port M2 communicates with the wheel brake FR of the right front wheel and the wheel brake RL of the left rear wheel. Hereinafter, the fluid line that initiates from the output port M1 will be referred to as a "first system," and the fluid line that initiates from the output port M2 will be referred to as a "second system."

In the hydraulic unit 10, two control valve devices VL are provided so as to correspond to the wheel brakes FL, RR in the first system. Similarly, two control valve devices VL are provided so as to correspond to the wheel brakes RL, FR in the second system. A reservoir 3, a pump 4, an orifice 5a, a regulator valve device (regulator) R, and a suction valve 7 are provided for each of the first system and the second system. In addition, a common motor 9 is provided to drive the pump 4 of the first system and the pump 4 of the second system.

In the following description, fluid lines extending from the output ports M1, M2 of the master cylinder MC to reach the regulator valve devices R will be referred to as an "output fluid pressure line A1." Fluid lines extending from the regulator valve device R of the first system to reach the wheel brakes FL, RR and fluid lines extending from the regulator valve device R of the second system to reach the wheel brakes RL, FR will be referred to as a "wheel hydraulic pressure line B." Fluid lines extending from the output hydraulic pressure lines A1 to reach the pumps 4 will be referred to as a "suction fluid pressure line C." Fluid lines extending from the pumps 4 to reach the wheel hydraulic pressure lines B will be referred to as a "discharge fluid pressure line D." Fluid lines extending from the wheel hydraulic pressure lines B to reach the suction hydraulic pressure lines C will be referred to as an "open line E."

The control valve devices VL are valves that control passages of hydraulic pressure from the master cylinder MC or the pumps 4 to the wheel brakes FL, RR, RL, FR (specifically speaking, to the wheel cylinders H), and wheel cylinder pressures (pressures within the wheel cylinders H) can be increased, held or reduced by the control valve devices VL. Because of this, the control valve devices VL each include an inlet valve 1, an output valve 2, and a check valve 1a.

The inlet valves 1 are normally open solenoid valves that are provided between the wheel brakes FL, RR, RL, FR and the master cylinder MC, that is, on the wheel hydraulic pressure lines B. The inlet valves 1 are normally open to thereby permit the transmission of brake hydraulic pressures from the master cylinder MC to the individual wheel brakes FL, FR, RL, RR. The inlet valves 1 are closed by the control unit 100 as required to thereby cut off the transmission of brake hydraulic pressure from the brake pedal BP to the individual wheel brakes FL, FR, RL, RR.

The outlet valves 2 are normally closed solenoid valves that are interposed between the wheel brakes FL, RR, RL, FR and the reservoirs 3, that is, between the wheel hydraulic pressure lines B and the open lines E. Although the outlet valves 2 are normally closed, the outlet valves 2 are opened as required by the control unit 100, whereby the brake hydraulic pressures acting on the wheel brakes FL, FR, RL, RR are released to the corresponding reservoirs 3.

The check valve 1a is connected in parallel to each inlet valve 1. The check valves 1a are valves that permit only a flow of brake fluid from the wheel brakes FL, FR, RL, RR to the master cylinder MC. When an input from the brake pedal BP is released, even with the inlet valves 1 closed, the check valves 1a permit the flow of brake fluid from the wheel brakes FL, FR, RL, RR to the master cylinder MC.

The reservoirs 3 are provided on the open lines E and have a function to reserve the brake hydraulic pressure that is released by opening the output valves 2. A check valve 3a is interposed between the reservoir 3 and the pump 4 so as to permit only a flow of brake fluid from the reservoir 3 to the pump 4.

The pump 4 is interposed between the suction hydraulic pressure line C that communicates with the output hydraulic pressure line A1 and the discharge hydraulic pressure line D that communicates with the wheel hydraulic pressure lines B and has a function to suck the brake fluid reserved in the reservoir 3 to discharge it to the discharge hydraulic pressure line D.

The orifice 5a attenuates pulsations produced by the pressure of the brake fluid discharged from the pump 4 and produced by the operation of the regulator valve device R, which will be described later.

The regulator valve device R normally permits flows of brake fluid from the output hydraulic pressure line A1 to the wheel hydraulic pressure lines B. When the pressures at the wheel cylinders H are increased by the brake hydraulic pressure produced by the pump 4, the regulator valve device R has a function to regulate pressures in the discharge hydraulic pressure line D, the wheel hydraulic pressure lines B and the control valve device VL (the wheel cylinders H) to a set value while cutting off the flows of brake fluid. The regulator valve device R includes a selector valve 6 and a check valve 6a.

The selector valves 6 are normally open linear solenoid valves that are interposed between the output hydraulic pressure lines A1 that communicates with the master cylinder MC and the wheel hydraulic pressure lines B that communicate with the wheel brakes FL, RR, RL, FR.

The check valve 6a is connected in parallel to the selector valve 6. This check valve 6a is a one-way valve that permits a flow of brake fluid from the output hydraulic pressure line A1 to the wheel hydraulic pressure lines B.

The suction valves 7 are normally closed solenoid valves that are produced on the suction hydraulic pressure lines C and are intended to switch a state where the suction hydraulic pressure lines C are opened and a state where the suction hydraulic pressure lines C are shut off.

The pressure sensor 91 detects a brake hydraulic pressure in the output hydraulic pressure lines A1, and the result of the detection is inputted into the control unit 100.

Next, the details of the control unit 100 will be described.

Figure 3:
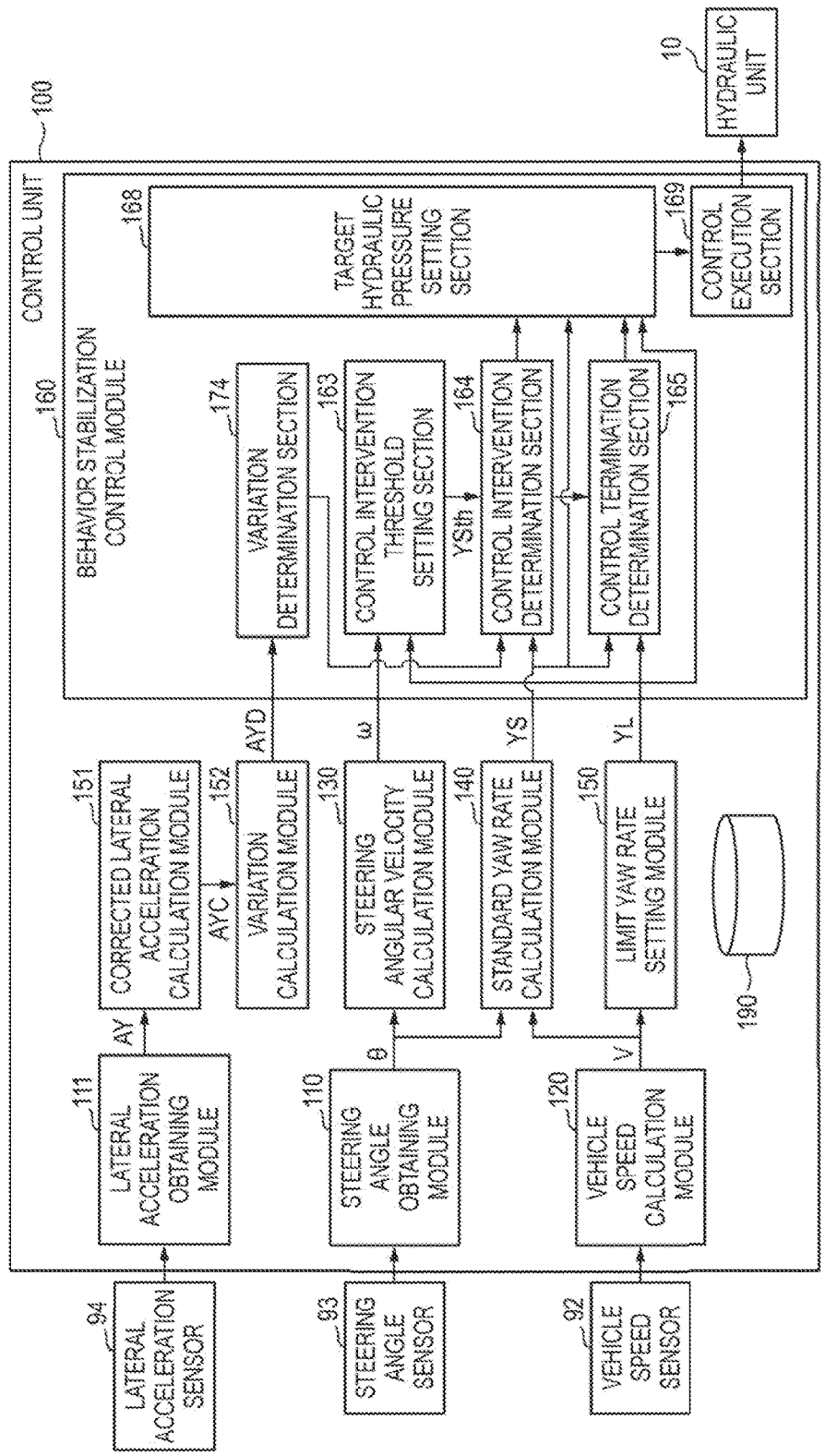
FIG. 3 is a block diagram showing the configuration of a control unit.

The control unit 100 is an apparatus that executes a control for stabilizing the behavior of the vehicle CR by giving a braking force to turning outer wheels of the vehicle CR based on a target braking force by controlling the hydraulic unit 10. Because of this, the control unit 100 includes, as shown in FIG. 3, a steering angle obtaining module 110, a lateral acceleration obtaining module 111, a vehicle speed calculation module 120, a steering angular speed calculation module 130, a standard yaw rate calculation module 140, a limit yaw rate setting module 150, a corrected lateral acceleration calculation module 151, a variation calculation module 152, a behavior stabilization control module 160 and a storage module 190. The pressure sensor 91 is omitted from FIG. 3 as an output of the pressure sensor 91 is not essential in the vehicle behavior control system A according to the embodiment. In the following description, such variables as lateral acceleration $\Delta Y$, steering angle $\theta$, and steering angular velocity $\omega$ take positive values for a left turn and negative values for a right turn.

The steering angle obtaining module 110 is a module for obtaining information on a steering angle $\theta$ for each control cycle from the steering angle sensor 93. The steering angle θ is outputted to the steering angular velocity calculation module 130 and the standard yaw rate calculation module 140.

The lateral acceleration obtaining module 111 is a module for obtaining information on lateral acceleration ΔY for each control cycle from the lateral acceleration sensor 94. The lateral acceleration ΔY is outputted to the corrected lateral acceleration calculation module 151.

The vehicle speed calculation module 120 is an example of a vehicle speed obtaining module and is module for obtaining information on wheel speeds (pulse signals of the wheel speed sensors 92) from the wheel speed sensors 92 for each control cycle to calculated wheels speeds and a vehicle speed V by a known technique. The calculated vehicle speed V is outputted to the standard yaw rate calculation module 140 and the limit yaw rate setting module 150.

The steering angular velocity calculation module 130 is a module for calculating a steering angular velocity ω from the steering angle θ. The steering angular velocity ω can be obtained by differentiating the steering angle θ or calculating a difference between the previous steering angle $θ_{n-1}$ and a latest steering angle $θ_n$. The calculated steering angular velocity ω is outputted to the behavior stabilization control module 160. In this specification, a subscript n added to a variable denotes that a variable is a latest value, and a subscript n−1 denotes that a variable is the previous value.

The standard yaw rate calculation module 140 is a module for calculating a standard yaw rate YS as a yaw rate intended by the driver based on the steering angle θ and the vehicle speed V by a known technique. The calculated standard yaw rate YS is outputted to the behavior stabilization control module 160.

The limit yaw rate setting module 150 is a module for setting a limit yaw rate YL that is a limit yaw rate that enables the vehicle to be driven stably based on the vehicle speed V and a road surface friction coefficient. Specifically, as shown in a graph in FIG. 11 that shows changes in plural yaw rates, two types of yaw rates, that is, a first limit yaw rate YL1 and a second limit yaw rate YL2 are set for the limit yaw rate YL, and two right and left turn values for each of the limit yaw rates YL1, YL2 (in total, four values) are calculated. The second limit yaw rate YL2 is calculated by using the road surface friction coefficient of a value that is made smaller than the first limit yaw rate YL1 by a predetermined ratio. This makes an absolute value of the second limit yaw rate YL2 smaller than an absolute value of the first limit yaw rate YL1. The limit yaw rates YL1, YL2 are set so as to take smaller values as the vehicle speed V becomes faster. In this embodiment, a road surface condition when calculating the first limit yaw rate YL1 is assumed to be a dry road surface. However, in the event that the control unit 100 holds a reliable estimated road surface friction coefficient, the limit yaw rates YL1, YL2 may be calculated by using the estimated road surface friction coefficient. The calculated limit yaw rates YL (YL1, YL2) are outputted to the behavior stabilization control module 160.

Figure 4:
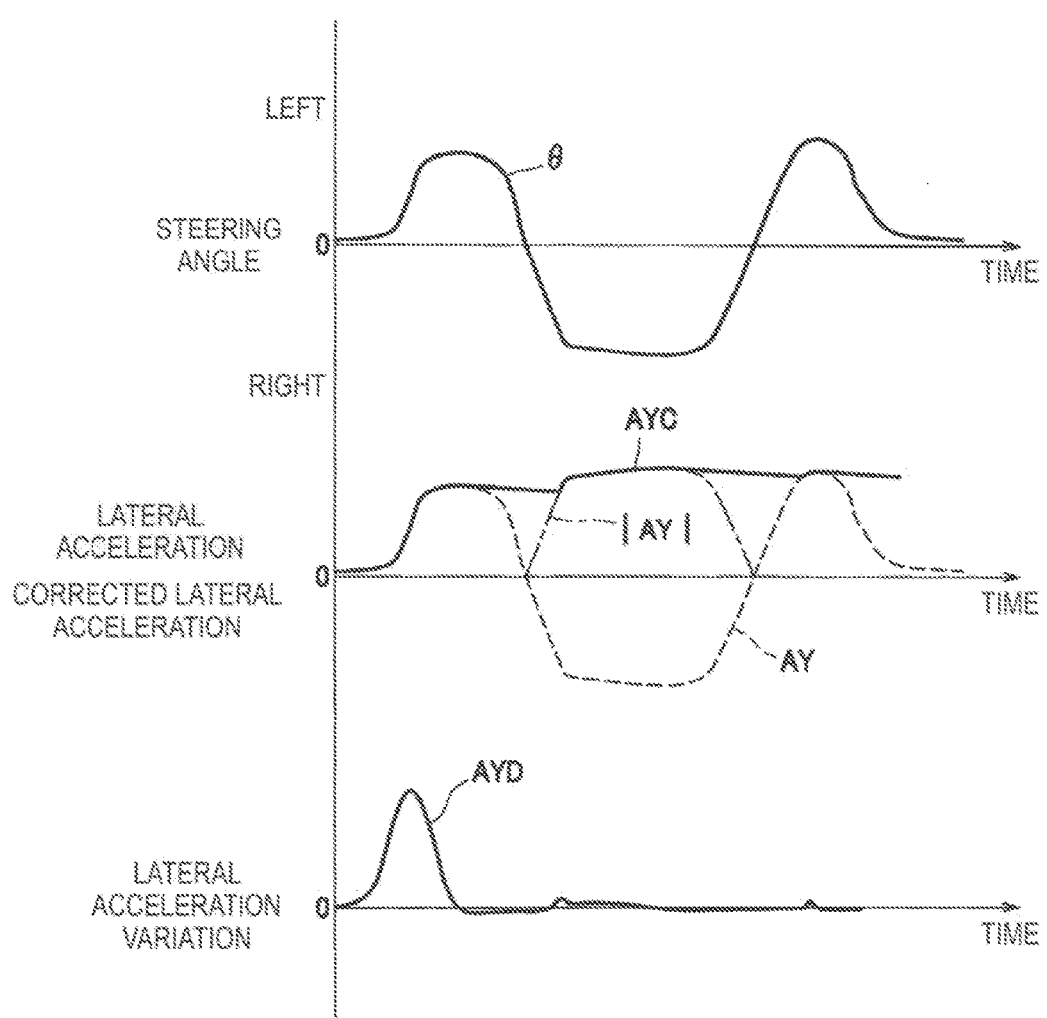
FIG. 4 is a timing chart showing changes in steering angle, lateral acceleration, corrected lateral acceleration and variation in lateral acceleration.

The corrected lateral acceleration calculation module 151 is a module for calculating a corrected lateral acceleration AYC that is a value resulting from filtering a lateral acceleration ΔY. Specifically, as shown in FIG. 4, an absolute value |ΔY| of the lateral acceleration ΔY is calculated, and a corrected lateral acceleration AYC is calculated. This corrected lateral acceleration AYC is changed so as to be smaller than the previous value within a range of a predetermined variation in such a way that when the absolute value |ΔY| increases, the corrected lateral acceleration AYC takes the same value as that of the absolute value |ΔY| so as to increase as the absolute value |ΔY| increases, whereas when the absolute value |ΔY| decreases, the corrected lateral acceleration AYC takes a value that is made difficult to decrease. The calculated corrected lateral acceleration AYC is outputted to the variation calculation module 152.

The variation calculation module 152 is a module for calculating a lateral acceleration variation ΔYD that is a temporal variation of the corrected lateral acceleration AYC. The lateral acceleration variation ΔYD can be calculated, for example, by calculating a difference between the previous corrected lateral acceleration $AYC_{n-1}$ and a latest corrected lateral acceleration $AYC_n$. The calculated lateral acceleration variation ΔYD is outputted to the behavior stabilization control module 160.

The behavior stabilization control module 160 is a module for executing a behavior stabilization control that stabilizes the behavior of the vehicle CR by giving a braking force to turning outer wheels of the vehicle CR based on a target braking force. In this embodiment, a target hydraulic pressure PT is set as a value that corresponds to a target braking force, and the hydraulic unit 10 is controlled so that the wheel cylinder pressure of the wheel brake FL, RR, RL, FR of the turning outer wheels becomes the target hydraulic pressure PT. To execute this control, the behavior stabilization control module 160 includes a control intervention threshold setting section 163, a control intervention determination section 164, a control termination determination section 165, a variation determination section 174, a target hydraulic pressure setting section 168 as an example of a target braking force setting section, and a control execution section 169.

Figure 5:
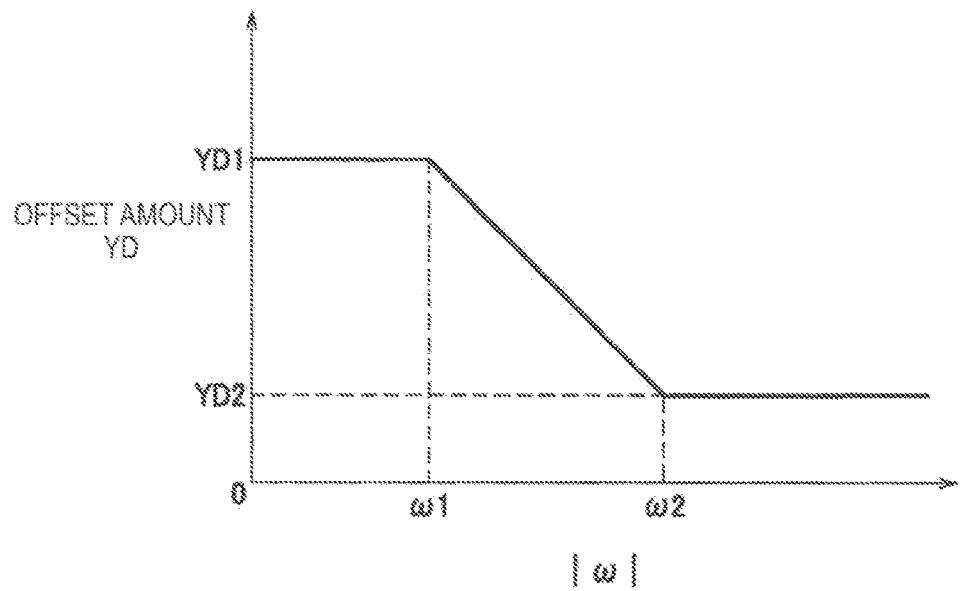
FIG. 5 is a map showing a relationship between steering angular velocity and offset amount.

The control intervention threshold setting section 163 is a section for setting a control intervention threshold YSth based on the limit yaw rate YL and the steering angular velocity ω. Specifically, a first control intervention threshold YSth1 is calculated by adding an offset amount YD that is dependent on an absolute value of the steering angular velocity ω to the first limit yaw rate YL1 (by adding the offset amount YD to a negative side of the first limit yaw rate YL1 for the right turn), and a second control intervention threshold YSth2 is calculated by adding the offset amount YD to the second limit yaw rate YL2. As shown in FIG. 5, the offset amount YD is made to stay at a constant value YD1 until the absolute value of the steering angular velocity ω reaches a predetermined value ω1 from 0 while made to decrease as the absolute value of the steering angular velocity ω increases until the absolute value of the steering angular velocity ω reaches a predetermined value ω2 from the predetermined value ω1. In a range larger than the predetermined value ω2, the offset amount YD is made to stay at a constant value YD2 that is smaller than YD1. Because of this, absolute values of the control intervention thresholds YSth1, YSth2 are set so as to decrease as the absolute value of the steering angular velocity ω increases. As shown in the graph in FIG. 11 that shows the changes in the plural yaw rates, two right and left turn values for each of the control intervention thresholds YSth1, YSth2 (in total, four values) are calculated. In this embodiment, since the absolute value of the second limit yaw rate YL2 is smaller than the absolute value of the first limit yaw rate YL1, the absolute value of the second control intervention threshold YSth2 takes a smaller value that the absolute value of the first control intervention threshold YSth1. The control intervention threshold setting section 163 outputs the calculated control intervention threshold YSth (YSth1, YSth2) to the control intervention determination section 164.

The variation determination section 174 is a section for determining whether or not the lateral acceleration variation $\Delta YD$ is equal to or larger than a variation threshold AYth that is an example of a first determination threshold. The variation threshold AYth is set as a value that is something like a value that the lateral acceleration variation $\Delta YD$ can exceed before an absolute value of the standard yaw rate YS exceeds the absolute values of the control intervention thresholds YSth1, YSth2. The variation determination section 174 outputs the result of the determination to the control intervention determination section 164.

The control intervention determination section 164 is a section that determines that the behavior stabilization control be started in case the absolute value of the standard yaw rate YS exceeds the absolute value of the control intervention threshold YSth that is set by the control intervention threshold setting section 163. Specifically, in case the variation determination section 174 determines that the lateral acceleration variation $\Delta YD$ is equal to or larger than the variation threshold AYth, the control intervention determination section 164 determines that the behavior stabilization control be started when the absolute value of the standard yaw rate YS exceeds the absolute value of the first control intervention value YSth1. On the other hand, in case the variation determination section 174 determines that the lateral acceleration variation $\Delta YD$ is smaller than the variation threshold AYth, the control intervention determination section 164 determines that the behavior stabilization control be started when the absolute value of the standard yaw rate YS exceeds the absolute value of the second control intervention threshold YSth2. In case the standard yaw rate YS is positive, the left turn control intervention thresholds YSth1, YSth2 are compared, whereas in case the standard yaw YS is negative, the right turn control intervention thresholds YSth1, YSth2 are compared.

When the control intervention determination section 164 determines that the behavior stabilization control be started as a result of the absolute value of the standard yaw rate YS exceeding the absolute value of the first control intervention threshold YSth1, the control intervention determination section 164 changes a control mode M from a non-controlling mode (M=0) to a first turn controlling mode (M=1). On the other hand, When the control intervention determination section 164 determines that the behavior stabilization control be started as a result of the absolute value of the standard yaw rate YS exceeding the absolute value of the second control intervention threshold YSth2, the control intervention determination section 164 changes the control mode M from the non-controlling mode (M=0) to a second turn controlling mode (M=2). Since the control intervention thresholds YSth1, YSth2 are set based on the steering angular velocity $\omega$, the control intervention determination section 164 determines the start of the behavior stabilization control based on the steering angular velocity $\omega$.

In this embodiment, since the absolute value of the second control intervention threshold YSth2 is smaller than the absolute value of the first control intervention threshold YSth1, the absolute value of the standard yaw rate YS is made easy to exceed the absolute value of the second control intervention threshold YSth2. Namely, in this embodiment, the control intervention determination section 164 is made to start the behavior stabilization control more easily when the control mode M is 2 (the second turn) than when the control mode M is 1 (the first turn).

The control termination determination section 165 is a section for determining the termination of the behavior stabilization control. Specifically, the control termination determination section 165 determines that the behavior stabilization control be terminated when the behavior stabilization control is started as a result of the absolute value of the standard yaw rate YS exceeding the absolute value of the first control intervention threshold YSth1, that is, in case the absolute value of the standard yaw rate YS becomes smaller than the absolute value of the first limit yaw rate YL1 as the control termination threshold when the control mode M is 1. The control termination determination section 165 determines that the behavior stabilization control be terminated when the behavior stabilization control is started as a result of the absolute value of the standard yaw rate YS exceeding the absolute value of the second limit yaw rate YL2, that is, in case the absolute value of the standard yaw rate YS becomes smaller than the absolute value of the second limit yaw rate YL2 as the control termination threshold when the control mode M is 2. When determining that the behavior stabilization control be terminated, the control termination determination section 165 switches the control mode M to a termination processing mode (M=3).

The target hydraulic pressure setting section 168 is a section for setting a target hydraulic pressure PT according to whether the control mode M is the controlling mode (M=1 or 2) or the termination processing mode (M=3). Firstly, a case where the control mode M is the controlling mode will be described. When the behavior stabilization control is being performed, the target hydraulic pressure setting section 168 sets a target hydraulic pressure PT based on the standard yaw rate YS and the limit yaw rate YL (YL1, YL2).

Figure 6:
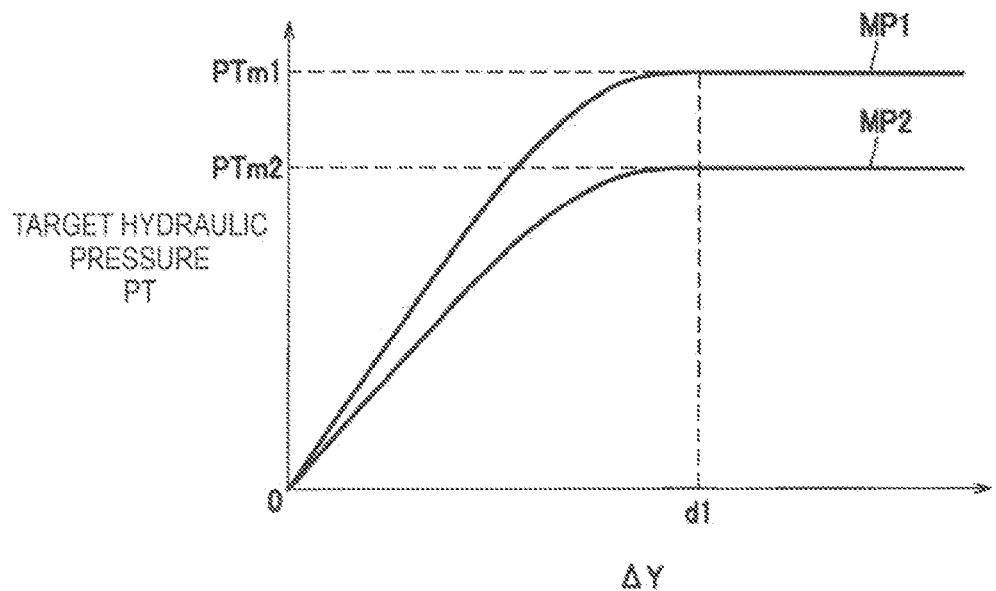
FIG. 6 is a map for setting a target hydraulic pressure that shows a relationship between a deviation between standard yaw rate and limit yaw rate and a target hydraulic pressure.

The target hydraulic pressure setting section 168 sets a target hydraulic pressure PT based on the standard yaw rate YS and a deviation $\Delta Y$ of the limit yaw rate YL so that the target hydraulic pressure PT takes a larger value as the deviation $\Delta Y$ increases. $\Delta Y$ is calculated so that in the event that an absolute value $|YS-YL|$ of a difference between the standard yaw rate YS and the limit yaw rate YL increases, $\Delta Y$ takes the value of $|YS-YL|$ as it is, whereas in the event the absolute value $|YS-YL|$ decreases, $\Delta Y$ holds the previous value. Namely, $\Delta Y$ changes so as to hold its peak value after $|YS-YL|$ reaches the peak value. FIG. 6 shows maps MP1, MP2 for setting the target hydraulic pressure PT, and the maps MP1, MP2 are determined so that the target hydraulic pressure PT takes a larger value as $\Delta Y$ increases. To described this in detail, the map MP1 is determined so that the target hydraulic pressure PT increases gradually until the deviation $\Delta Y$ reaches a predetermined value d1 from 0, whereas when the deviation $\Delta Y$ is equal to or larger than the predetermined value d1, the target hydraulic pressure PT stays at a constant upper limit value PTm1. In the map MP2, the target hydraulic pressure PT is set to a smaller value than the target hydraulic pressure PT of the map MP1. The map MP2 is set so that the target hydraulic pressure PT increases gradually until the deviation $\Delta Y$ reaches the predetermined value d1 from 0, whereas when the deviation $\Delta Y$ is equal to or larger than the predetermined value d1, the target hydraulic pressure PT stays at a constant upper limit value PTm2 that is smaller than PTm1.

The deviation $\Delta Y$ reflects a disturbance to the behavior of the vehicle CR, and therefore, a braking force that corresponds to the magnitude of an estimated disturbance to the behavior of the vehicle CR can be given to turning outer wheels by setting the target hydraulic pressure PT according to the magnitude of the deviation $\Delta Y$. Therefore, it is possible to mitigate the disturbance to the behavior of the vehicle CR.

Firstly, the target hydraulic pressure setting section 168 determines that a first turn is made in case the control mode M is 1 (in case the lateral acceleration variation AYD is equal to or larger than the variation threshold AYth when the behavior stabilization control is started and the standard yaw rate YS exceeds the control intervention threshold YSth as an example of a second determination threshold or specifically the first control intervention threshold YSth1), whereas the target hydraulic pressure setting section 168 determines that a second turn is made in case the control mode M is 2 (in case the lateral acceleration variation ΔYD is smaller than the variation threshold AYth when the behavior stabilization control is started and the standard yaw rate YS exceeds the control intervention threshold YSth or specifically the second control intervention threshold YSth2).

Figure 11:
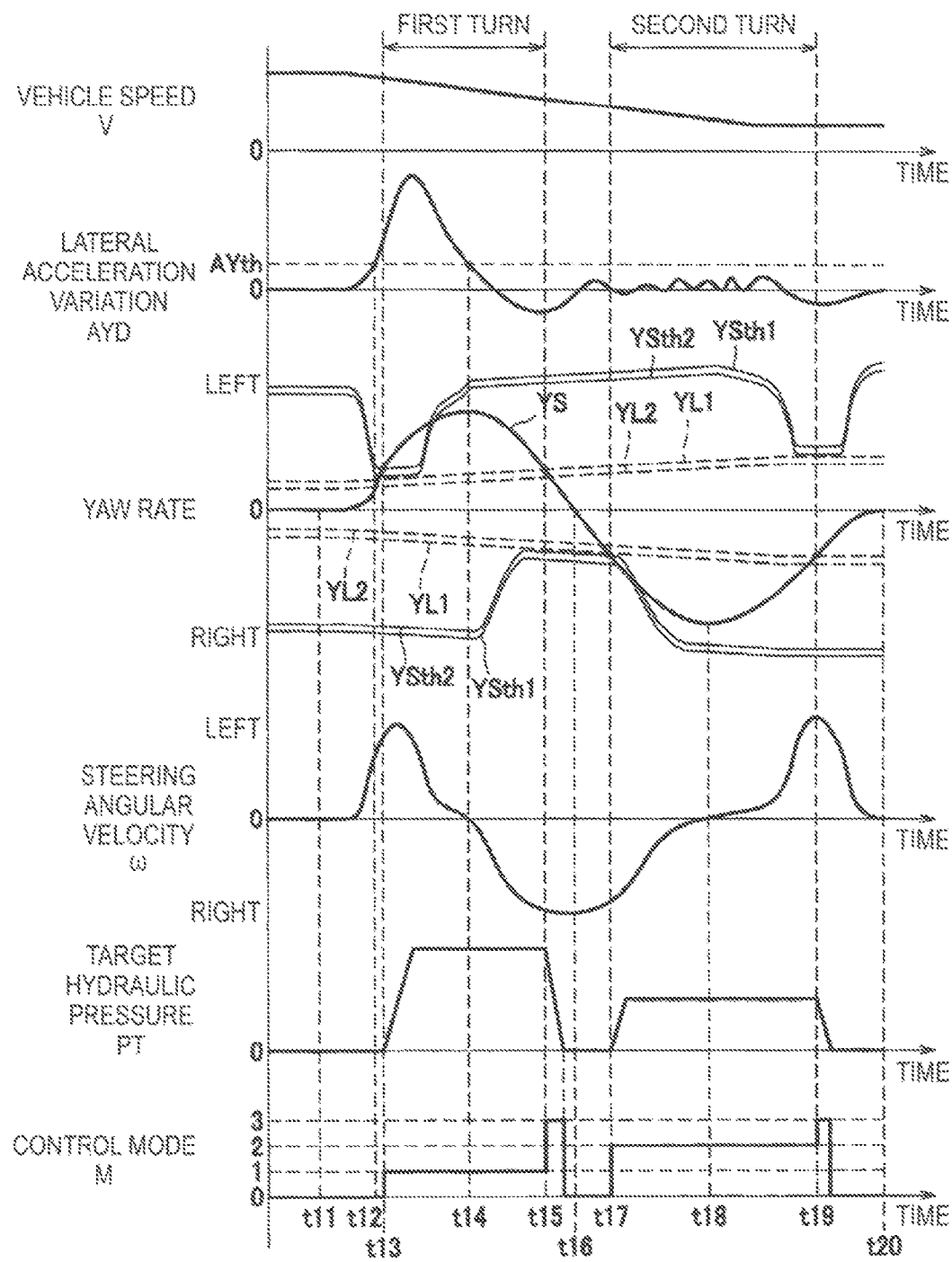
FIG. 11 is a timing chart for describing a vehicle behavior control operation that shows changes in vehicle speed, lateral acceleration variation, plural yaw rates, steering angular velocity and change in target hydraulic pressure.

When determining that the first turn is made (when the control mode M is 1), the target hydraulic pressure setting section 168 sets the target hydraulic pressure PT from the standard yaw rate YS and the deviation ΔY of the first limit yaw rate YL1 based on the map MP1. When determining that the second turn is made (when the control mode M is 2), the target hydraulic pressure setting section 168 sets the target hydraulic pressure PT from the standard yaw rate YS and the deviation ΔY of the second limit yaw rate YL2 based on the map MP2 whose value is smaller than that of the map MP1. By doing so, the target hydraulic pressure setting section 168 set the target hydraulic pressure PT so that it becomes smaller for the second turn than for the first turn as shown in FIG. 11.

Figure 7:
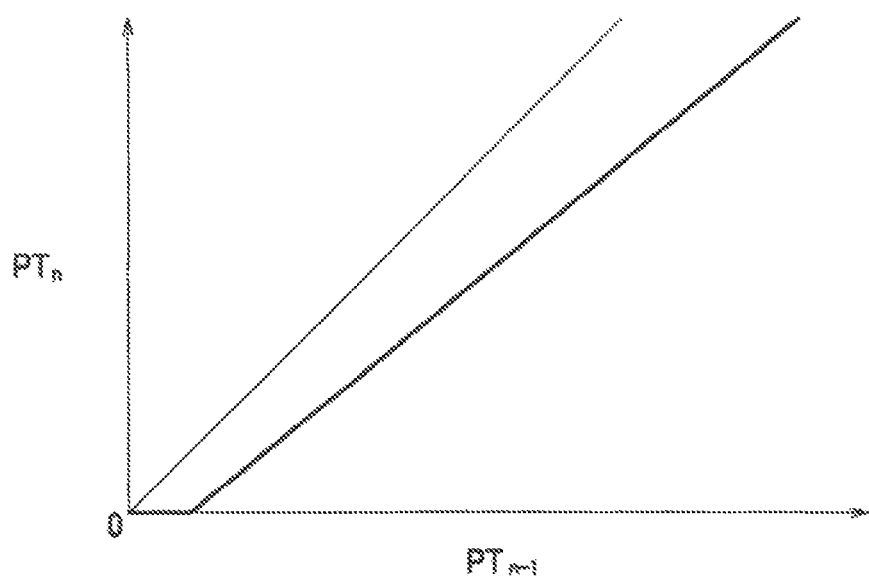
FIG. 7 is a map for setting a latest target hydraulic pressure $PT_n$ in a termination processing mode that shows a relationship between the previous target hydraulic pressure $PT_{n-1}$ and a latest target hydraulic pressure $PT_n$.

Next, setting of the target hydraulic pressure PT in the termination processing mode will be described. In the termination processing mode, the target hydraulic pressure setting section 168 sets a latest target hydraulic pressure $PT_n$ from the previous target hydraulic pressure $PT_{n-1}$ based on a map shown in FIG. 7. In the map shown in FIG. 7, the latest target hydraulic pressure $PT_n$ increases as the previous target hydraulic pressure PTn-1 increases. However, the latest target hydraulic pressure $PT_n$ is set so as to take a value that is slightly smaller than the target hydraulic pressure $PT_{n-1}$. In case the previous target hydraulic pressure $PT_{n-1}$ is smaller than a predetermined value, the latest target hydraulic pressure $PT_n$ is set so as to become 0. In case the latest target hydraulic pressure $PT_n$ becomes 0, the target hydraulic pressure setting section 168 changes the control mode M to the non-controlling mode (M=0).

The control execution section 169 is a section for controlling the hydraulic unit 10 based on the target hydraulic pressure PT that is set by the target hydraulic pressure setting section 168 to thereby control the pressure in the wheel cylinder at the turning outer wheel so as to become the target hydraulic pressure PT. Although the detailed description of this control is omitted herein because the control is known, to describe it briefly, the motor 9 is activated to drive the pump 4, and after the suction valve 7 is opened, an appropriate electric current is controlled to flow to the regulator valve device R.

The storage module 190 is a module for storing constants, parameters, the control modes, the maps, the results of calculations and the like that are necessary to operate the control unit 100 as required.

Figure 8:
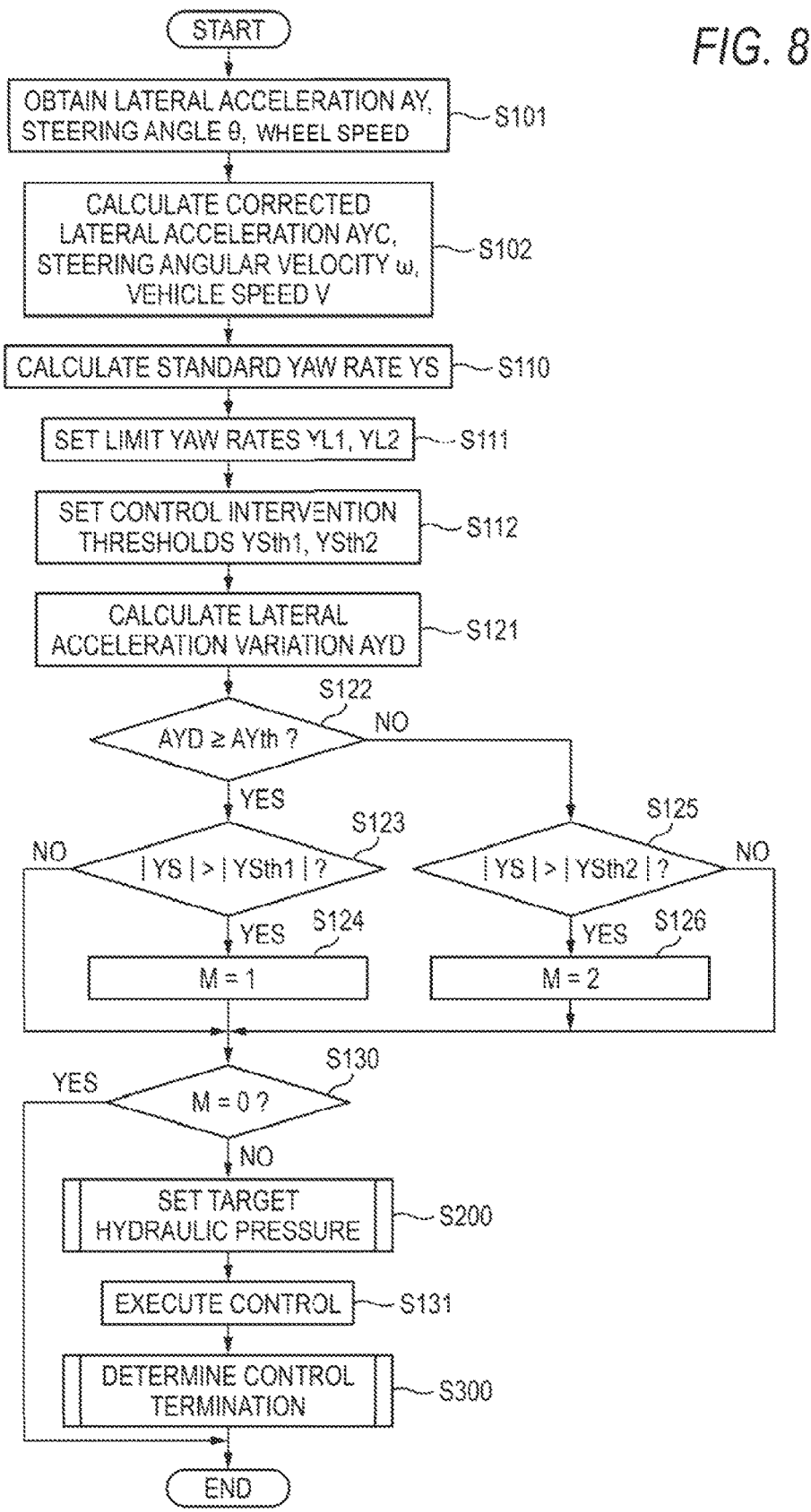
FIG. 8 is a flowchart showing a whole process of a behavior stabilization control.

Processing by the control unit 100 of the vehicle behavior control system A that is configured as has been described heretofore will be described by reference to FIG. 8. Processing shown in FIG. 8 is performed repeatedly for each control cycle. An initial value of the control mode M is 0.

Firstly, the lateral acceleration obtaining module 111 obtains a lateral acceleration ΔY from the lateral acceleration sensor 94, and the steering angle obtaining module 110 obtains a steering angle θ from the steering angle sensor 93, the vehicle speed calculation module 120 obtaining wheels speeds from the wheel speed sensors 92 (S101). Then, the corrected lateral acceleration calculation module 151 calculates a corrected lateral acceleration AYC from the lateral acceleration ΔY, and the steering angular velocity calculation module 130 calculates a steering angular velocity w from the steering angle θ, the vehicle speed calculation module 120 calculating a vehicle speed V from the wheel speeds (S102). Next, the standard yaw rate module 140 calculates a standard yaw rate YS based on the steering angle θ and the vehicle speed V (S110). The limit yaw rate setting module 150 sets the limit yaw rates YL1, YL2 based on the vehicle speed V and a road surface friction coefficient (S111).

Next, the control intervention threshold setting section 163 sets control intervention thresholds YSth1, YSth2 based on the limit yaw rates YL1, YL2 and the steering angular velocity ω (S112). As this occurs, as described above, control intervention thresholds YSth1, YSth2 are set by adding the offset amount YD that decreases as the absolute value of the steering angular velocity increases as shown in FIG. 5 to the limit yaw rates YL1, YL2, and therefore, the magnitudes of the control intervention thresholds YSth1, YSth2 are set so as to become smaller as the absolute value of the steering angular velocity ω becomes larger.

Next, the variation calculation module 152 calculates a lateral acceleration variation ΔYD from the corrected lateral acceleration AYC (S121). Then, the variation determination section 174 determines whether or not the lateral acceleration variation ΔYD is equal to or larger than the variation threshold AYth (S122). In case the lateral acceleration variation ΔYD is equal to or larger than the variation threshold AYth (S122, Yes), the control intervention determination section 164 determines whether or not the absolute value of the standard yaw rate YS is larger than the absolute value of the corresponding first control intervention threshold YSth1 of the right turn and left turn first control intervention thresholds (S123). In case the absolute value of the standard yaw rate YS is larger than the absolute value of the first control intervention threshold YSth1 (S123, Yes), the control intervention determination section 164 determines that the behavior stabilization control be started and switches the control mode M to 1 (S124).

In step S122, in case the lateral acceleration variation ΔYD is smaller than the variation threshold AYth (step S122, No), the control intervention determination section 164 determines whether or not the absolute value of the standard yaw rate YS is larger than the absolute value of the corresponding second intervention threshold YSth2 of the right turn and left turn second intervention thresholds (S125). In case the absolute value of the standard yaw rate YS is larger than the absolute value of the second control intervention threshold YSth2 (S125, Yes), the control intervention determination section 164 determines that the behavior stabilization control be started and switches the control mode M to 2 (S126).

In case the absolute value of the standard yaw rate YS is not larger than the absolute value of the first control intervention threshold YSth1 (S123, No) or the absolute value of the standard yaw rate YS is not larger than the absolute value of the second control intervention threshold YSth2 (S125, No), the control intervention determination section 164 proceeds to step S130 without changing the control mode M.

Then, the behavior stabilization control module 160 determines whether or not the control mode M is 0, that is, whether the control mode M is the non-controlling mode or the controlling mode. In case the controlling mode M is not 0 (S130, No: M=1, 2 or 3), the behavior stabilization control module 160 executes operations from steps S200 to S300, whereas in case the control mode M is 0 (S130, Yes), the behavior stabilization control module 160 terminates the process.

Figure 9:
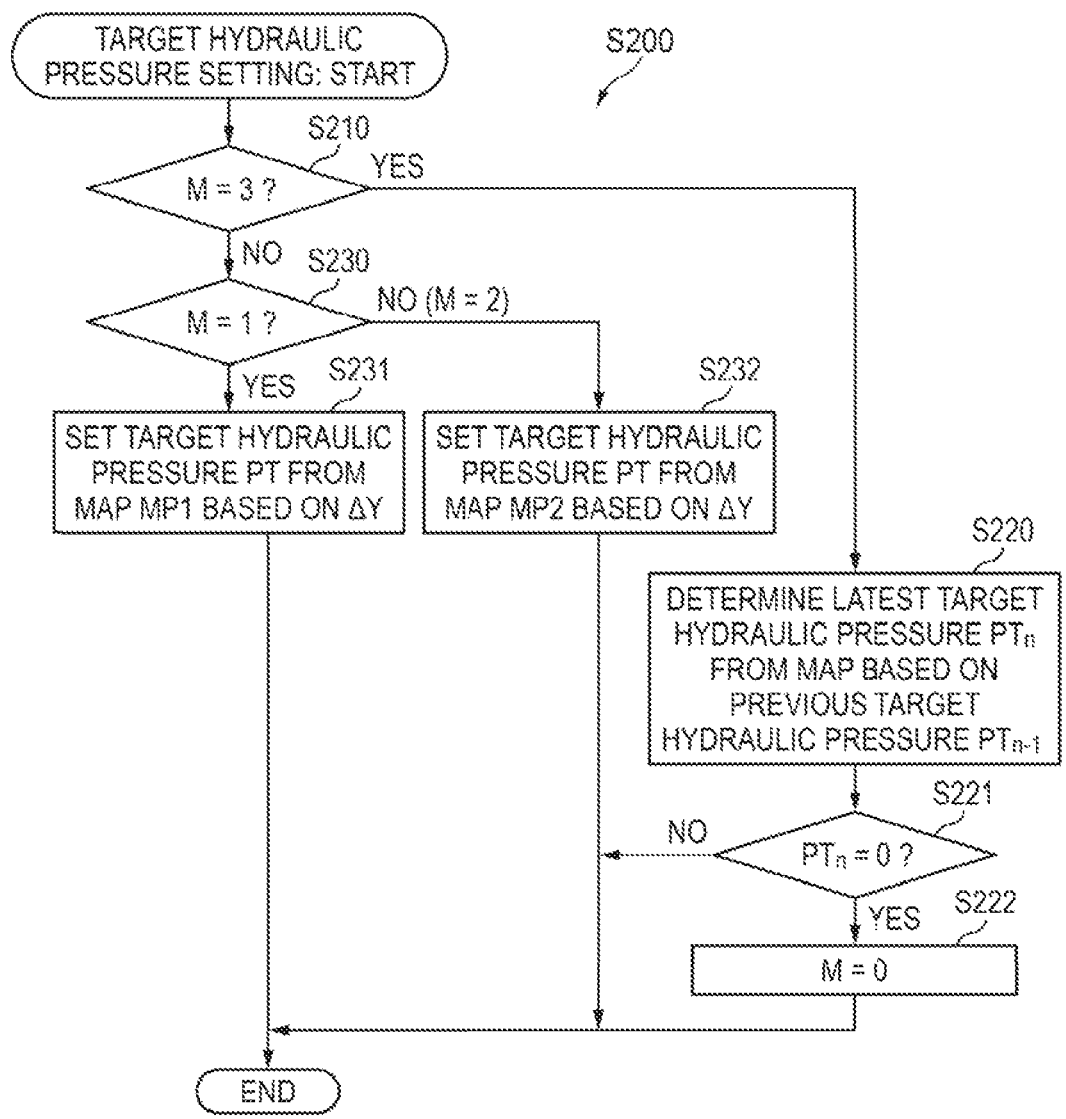
FIG. 9 is a flowchart showing a target hydraulic pressure setting process.

At step S200, the behavior stabilization control module 160 sets the target hydraulic pressure PT. As shown in FIG. 9, the target hydraulic pressure setting section 168 determines whether or not the control mode M is 3. In case the control mode M is 3, that is, in case a termination process is in operation (S210, Yes), the target hydraulic pressure setting section 168 sets a latest target hydraulic pressure $PT_n$ from the previous target hydraulic pressure $PT_{n-1}$ based on the map in FIG. 7 (S220). Then, in case the latest target hydraulic pressure $PT_n$ is 0 (S221, Yes), determining that the termination process has been completed, the target hydraulic pressure setting section 168 switches the control mode M to 0 (S222). On the other hand, in case the latest target hydraulic pressure $PT_n$ is not 0 (S221, No), the target hydraulic pressure setting section 168 terminates the process without changing the control mode M.

At step S210, in case the control mode M is not 3 (S210, No), the target hydraulic pressure setting section 168 determines whether or not the control mode M is 1 (S230). In case the control mode M is 1 (S230, Yes), since a first turn is being made, the target hydraulic pressure setting section 168 sets the target hydraulic pressure PT based on the deviation ΔY between the standard yaw rate YS and the first limit yaw rate YL1 from the map MP1 in FIG. 6 (S231). On the other hand, in case the control mode M is not 1, that is, in case the control mode M is 2 (S230, No), since a second turn is being made, the target hydraulic pressure setting section 168 sets the target hydraulic pressure PT based on the deviation ΔY between the standard yaw rate YS and the second limit yaw rate YL2 from the map MP2 in FIG. 6 (S232).

When the target hydraulic pressure PT is set in the way described above, returning to FIG. 8, the control execution section 169 controls the hydraulic unit 10 so that the hydraulic pressure in the wheel cylinder H of the turning outer wheel becomes the target hydraulic pressure PT (S131).

Figure 10:
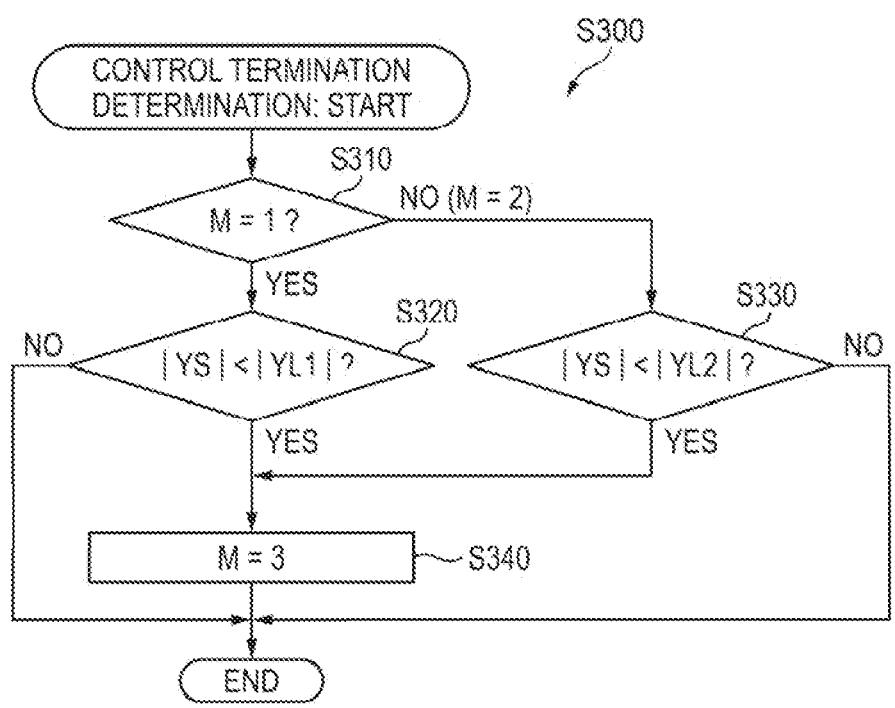
FIG. 10 is a flowchart showing a control termination determining process.

Next, the control termination determination section 165 determines at step S300 that the control terminates. Specifically, as shown in FIG. 10, the control termination determination section 165 determines whether or not the control mode M is 1 (S310). In case the control mode M is 1 (S310, Yes), the control termination determination section 165 determines whether or not the absolute value of the standard yaw rate YS is smaller than the absolute value of the corresponding first limit yaw rate YL1 of the left and right turn first limit yaw rates. In case the control termination determination section 165 determines that it is true (S320, Yes), determining that the behavior stabilization control be terminated, the control termination determination section 165 switches the control mode M to 3 that denotes that the termination process is in operation (S340). In case the control mode M is 2 (S310, No), the control termination determination section 165 determines whether or not the absolute value of the standard yaw rate YS is smaller than the absolute value of the corresponding second limit yaw rate YL2 of the left and right turn second limit yaw rates. In case the control termination determination section 165 determines that it is true (S330, Yes), determining that the behavior stabilization control be terminated, the control termination determination section 165 switches the control mode M to 3 (S340).

In case the absolute value of the standard yaw rate YS is not smaller than the absolute value of the first limit yaw rate YL1 (S320, No) or in case the absolute value of the standard yaw rate YS is not smaller than the absolute value of the second limit yaw rate YL2 (S330, No), the control termination determination section 165 terminates the process without switching the control mode M.

Changes in various parameters due to the controls described above will be described by reference to FIG. 11. Although the steering angle θ is not shown in FIG. 11, the steering angle θ changes substantially at the same phase as the standard yaw rate YS. In the following description, values of the parameters will be discussed in relation to their magnitudes, and "absolute values" will be omitted, the values of the parameters for the right turn being represented in a similar manner to the positive values.

As shown in a change in standard yaw rate YS in FIG. 11, in the vehicle CR, the steering wheel ST is turned to the left from a straight ahead driving condition during a time period from t11 to t14, and the steering wheel ST is turned back to the right during a time period from t14 to t18, the steering wheel ST being then turned back to the left during a time period from t18 to t20. Thus, the vehicle CR is turned to the left during a time period from t11 to t16 and is turned to the right during a time period from t16 to t20.

The limit yaw rates YL1, YL2 are set so as to decrease as the vehicle speed V increases, and therefore, the limit yaw rates YL1, YL2 increase gradually as the vehicle speed V decreases gradually after the time t11 on. The left turn control intervention thresholds YSth1, YSth2 decrease drastically as the steering angular velocity ω increases towards the left side after the time t11, while the left turn control intervention thresholds YSth1, YSth2 increase as the steering angular velocity ω decreases over a time period from t12 to t14. On the other hand, the right turn control intervention thresholds YSth1, YSth2 decrease as the steering angular velocity ω increases towards the right side after the time t14, while the right turn control intervention thresholds YSth1, YSth2 increase as the steering angular velocity ω decreases over a time period from near t15 to near t18.

When the steering wheel ST is turned to the left from the time t11, the standard yaw rate YS and the lateral acceleration variation ΔYD increase, and firstly, the lateral acceleration variation ΔYD becomes equal to or larger than the variation threshold AYth at the time t12. Then, in case the standard yaw rate YS exceeds the left turn first control intervention threshold YSth1 at a time t13 when the steering wheel ST has not yet be turned back to the right, it is determined that a first turn is being made, the control mode M is switched from 0 to 1, and a target hydraulic pressure PT is set based on the map MP1 in FIG. 6. In case the leftward standard yaw rate YS decreases and the standard yaw rate YS becomes smaller than the first limit yaw rate YL1 as the control termination threshold at the time t15, the first turn terminates, and the control mode M is switched from 1 to 3, whereupon the termination process is executed and the target hydraulic pressure PT decreases. Then, in case the termination process terminates, the control mode M is switched from 3 to 0. A left turn made over a time period from t11 to t16 becomes a first turn (the control mode M=1) over a time period from t13 to t15 because the lateral acceleration variation ΔYD is equal to or larger than the variation threshold AYth when the behavior stabilization control is started at the time t13.

The lateral acceleration variation ΔYD becomes smaller than the variation threshold AYth after the time t14 on. In case the standard yaw rate YS exceeds the right turn second control intervention threshold YSth2 at a time t17, it is determined that a second turn is being made, and the control mode M is switched to 2 from 0, whereupon a target hydraulic pressure PT is set which is smaller than that set for the first turn made over the time period from t13 to t15 based on the map MP2 in FIG. 6. In case the rightward standard yaw rate YS decreases and the standard yaw rate YS becomes smaller than the second limit yaw rate YL2 as the control termination threshold at a time t19, the second turn terminates, and the control mode M is switched from 2 to 3. Then, the termination process is executed, and the target hydraulic pressure PT decreases. Then, the termination process terminates, the control mode M is switched from 3 to 0. A right turn made over a time period from t16 to t20 becomes a second turn (the control mode M=2) over a time period from t17 to t19 because the lateral acceleration variation ΔYD is smaller than the variation threshold ΔYth when the behavior stabilization control is started at the time t17.

The advantage of the vehicle behavior control system A that has been configured in the way described above will be described by reference to FIGS. 12A to 15C.

Figure 12A:
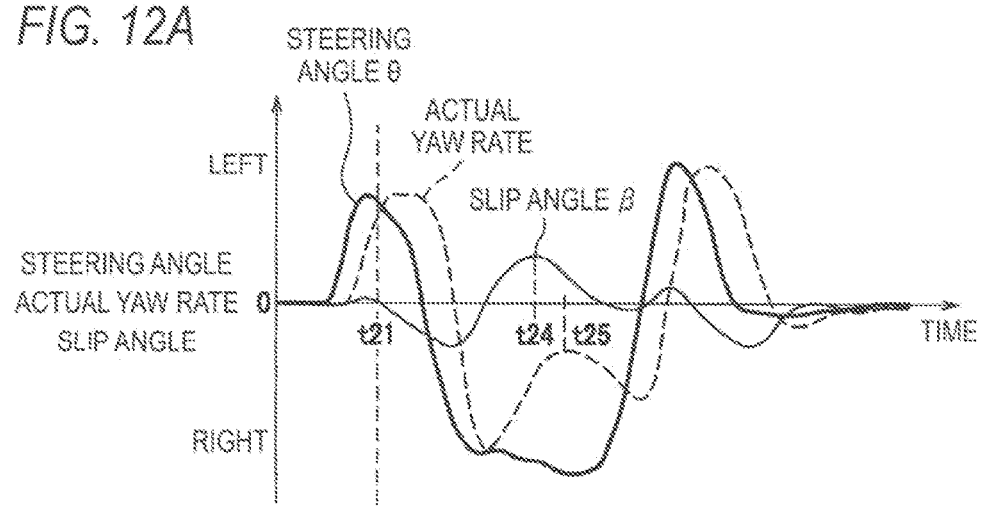
FIGS. 12A and 12B are timing charts in a conventional vehicle behavior control system.

FIGS. 12A to 13B show changes in parameters occurring when the vehicle is turned from a straight ahead driving condition to the left, then to the right and finally to the left so that the vehicle returns to the straight ahead driving condition. FIGS. 12A and 12B show changes in parameters when the start of a behavior stabilization control is determined by using a prior art vehicle behavior control system. In this prior art vehicle behavior control system, similar to the vehicle behavior control system described in JP-2011-102048-A, the start of a behavior stabilization control is determined in case a difference between a modified standard yaw rate whose upper limit is set based on a lateral acceleration and an actual yaw rate exceeds a threshold. The threshold does not change according to a steering angular velocity.

Figure 12B:
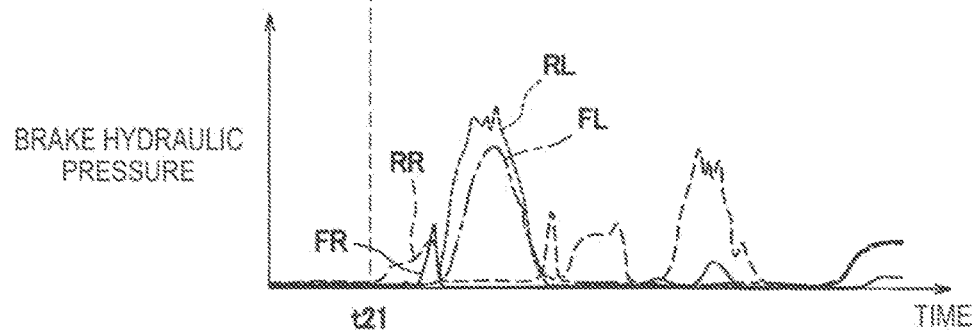

In the prior art vehicle behavior control system, as shown in FIG. 12A, the start of a behavior stabilization control is determined after a steering angle θ has reached its peak as a result of a steering wheel being turned to the left, that is, at a time t21 when the steering wheel is started to be turned back to the right. Then, as shown in FIG. 12B, no sufficient brake hydraulic pressure is produced when the vehicle is turned for the first time to make a left turn (during a first turn), and a sufficiently large brake hydraulic pressure is produced for the first time eventually when the vehicle is turned for the second time to make a right turn. Because of this, as shown in FIG. 12A, an actual yaw rate decreases at a time t25 and deviates largely from a steering angle, whereby an understeer condition tends to be produced. Then, a slip angle β (a drift angle at which the traveling direction of the vehicle drifts apart from the steering direction) that represents a disturbance to the behavior of the vehicle fluctuates largely at a time t24, and the behavior of the vehicle is disturbed.

Figure 13A:
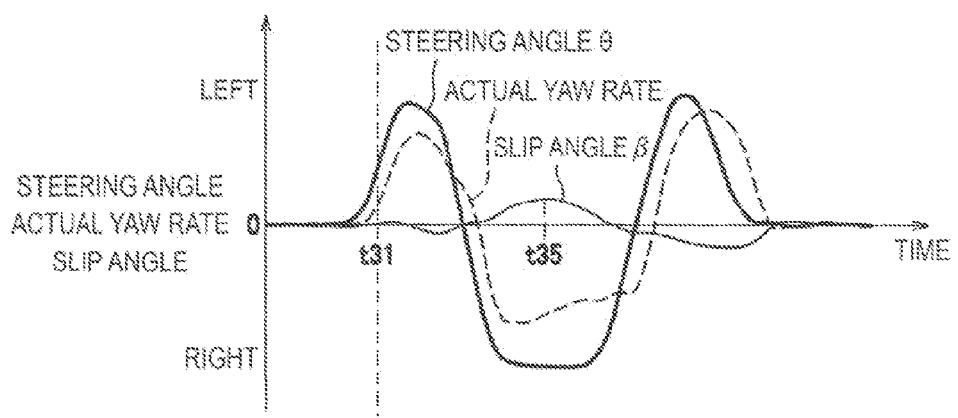
FIGS. 13A and 13B are timing charts in the vehicle behavior control system of this embodiment.
Figure 13B:
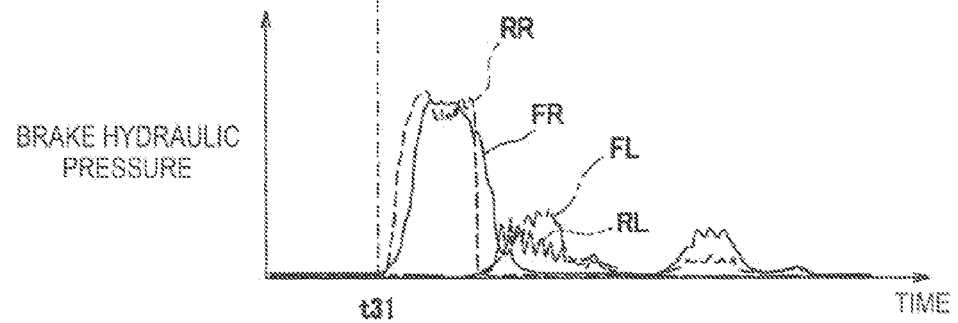

On the other hand, in the vehicle behavior control system A of this embodiment, as shown in FIG. 13A, the start of a behavior stabilization control is determined at a time t31 when a steering angle θ has not yet reached its peak, that is, when the steering wheel ST is turned for the first time. Then, as shown in FIG. 13B, a sufficiently large brake hydraulic pressure is produced during a left turn (during a first turn) that is made when the vehicle is steered for the first time. Because of this, the disturbance to the behavior of the vehicle is restricted, and as shown in FIG. 13B, a slip angle β is suppressed to a small value at a time t35 when the vehicle is being turned to the right.

Figure 14A:
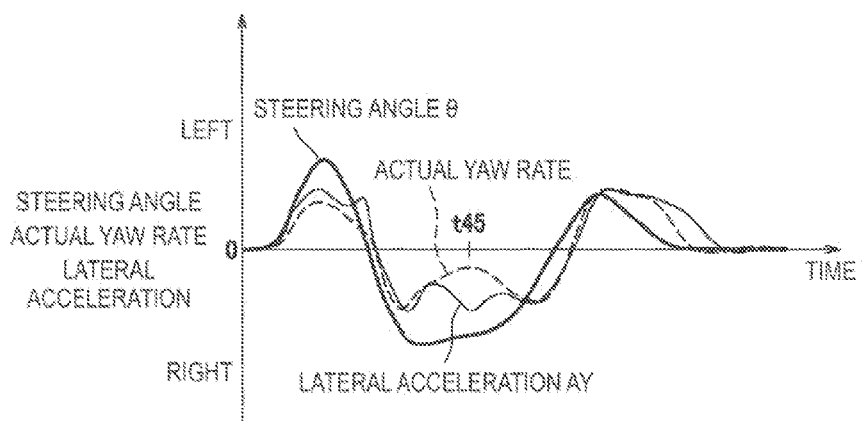
FIGS. 14A and 14B are timing charts in a vehicle behavior control system of a comparison example.
Figure 14B:
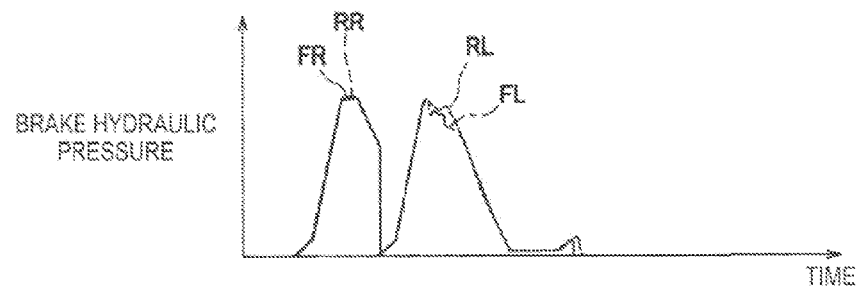
Figure 15A:
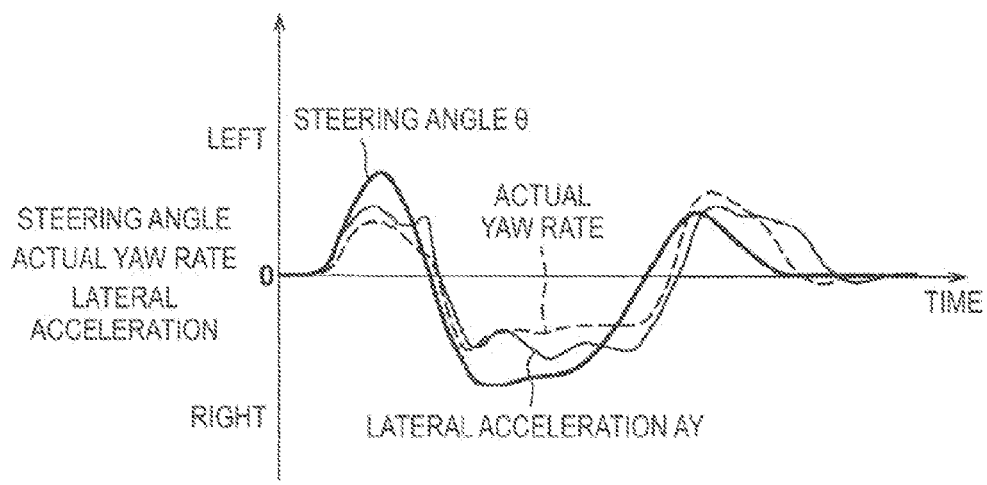
FIGS. 15A to 15C are timing charts in the vehicle behavior control system of this embodiment.
Figure 15B:
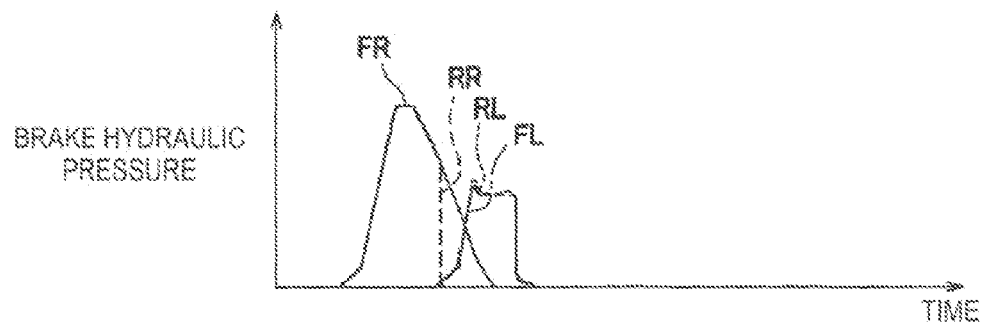
Figure 15C:
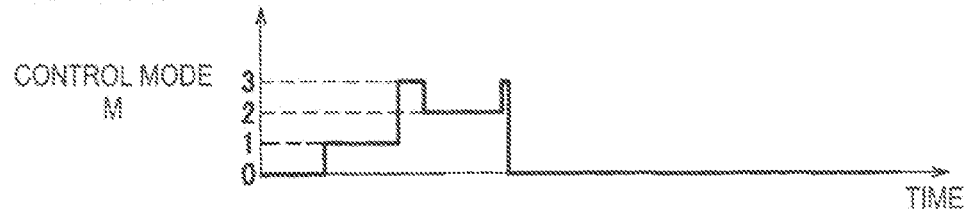

FIGS. 14A to 15C show changes in parameters occurring when the vehicle is turned from a straight ahead driving condition to the left (a first turn), then to the right (a second turn) and finally to the left so that the vehicle returns to the straight ahead driving condition. FIGS. 14A and 14B show changes in parameters occurring in a comparison example in which a target hydraulic pressure for the second turn is set based on a map that is the same as one used for the first turn, and FIGS. 15A to 15C show changes in parameters occurring in the embodiment in which the target hydraulic pressure PT for the second turn is set so as to be smaller than that for the first turn.

In the comparison example, the target hydraulic pressure for the second turn is set based on the same map as that used for the first turn, and therefore, as shown in FIGS. 14A and 14B, a large brake hydraulic pressure that is substantially the same as that for the first turn is produced for the second turn. Because of this, in the comparison example, the braking force becomes excessive during the second turn, and as shown in FIG. 14A, an actual yaw rate decreases at a time t45, as a result of which the actual yaw rate deviates largely from a steering angle θ, whereby an understeer condition tends to be produced.

On the other hand, in the embodiment, as shown in FIGS. 15A and 15B, a brake hydraulic pressure is produced for the second turn which is smaller than a brake hydraulic pressure produced for the first turn. This is because, as shown in FIG. 15C, the different control modes M are used for the first turn and the second turn. Specifically speaking, this is because the target hydraulic pressure PT is set for the second turn based on the map MP2 that is smaller in value than the map MP1 that is used for the first turn. Because of this, in this embodiment, the brake hydraulic pressure for the second turn is decreased, whereby, as shown in FIG. 15A, the actual yaw rate is restricted from being decreased during the second turn, and the tendency of producing the understeer condition is suppressed.

Thus, according to the vehicle behavior control system A of this embodiment, the target hydraulic pressure PT can be set smaller for the second turn than for the first turn, and therefore, it is possible to restrict the occurrence of an understeer condition during the vehicle behavior control for the second turn. In other words, the target hydraulic pressure PT can be set larger for the first turn than for the second turn, and therefore, a strong braking force can be given during the first turn, whereby it is possible to restrict effectively the occurrence of an oversteer condition during the vehicle behavior control for the first turn.

With the vehicle behavior control system A, the behavior stabilization control is made easier to be executed for the second turn in which the behavior of the vehicle CR tends to be more unstable than during the first turn than for the first turn. Therefore, the behavior of the vehicle CR can be stabilized further.

With the vehicle behavior control system A, it is possible to determine the start of the behavior stabilization control not based on the actual yaw rate but based on the steering angle θ, the steering angular velocity ω and the vehicle speed V. Therefore, it is possible to determine that the behavior stabilization control be started before the results of turning the steering wheel ST appear in the actual behavior of the vehicle CR. Because of this, the behavior stabilization control can be started earlier, thereby restricting the disturbance to the behavior of the vehicle CR.

With the vehicle behavior control system A, the control intervention thresholds YSth1, YSth2 decrease as the absolute value of the steering angular velocity ω increases, and therefore, the behavior stabilization control can be started in the initial stage where the steering wheel ST is turned to turn the vehicle from the straight ahead driving condition.

With the vehicle behavior control system A, the target hydraulic pressure PT increases as the deviation ΔY of the standard yaw rate YS from the limit yaw rate YL (YL1, YL2) increases, whereby the braking force that corresponds to the magnitude of an estimated disturbance to the behavior of the vehicle CR can be given to the turning outer wheels. Thus, the disturbance to the behavior of the vehicle CR can be mitigated.

Thus, while the embodiment has been described heretofore, the invention is not limited to the embodiment described above, and hence, the invention can be carried out in various forms as will be described below.

In this embodiment, the target hydraulic pressure setting section 168 (a target braking force setting section) is configured so that as shown in FIG. 11, when the behavior stabilization control is started at the time t13, the target hydraulic pressure setting section 168 determines that the first turn is made in case the lateral acceleration variation ΔYD is equal to or larger than the variation threshold AYth and the standard yaw rate YS exceeds the first control intervention threshold YSth1 and determines that the second turn is made in case the lateral acceleration variation ΔYD is smaller than the variation threshold AYth and the standard yaw rate YS exceeds the second control intervention threshold YSth2 when the behavior stabilization control is started at the time t17. However, the invention is not limited thereto.

Figure 16:
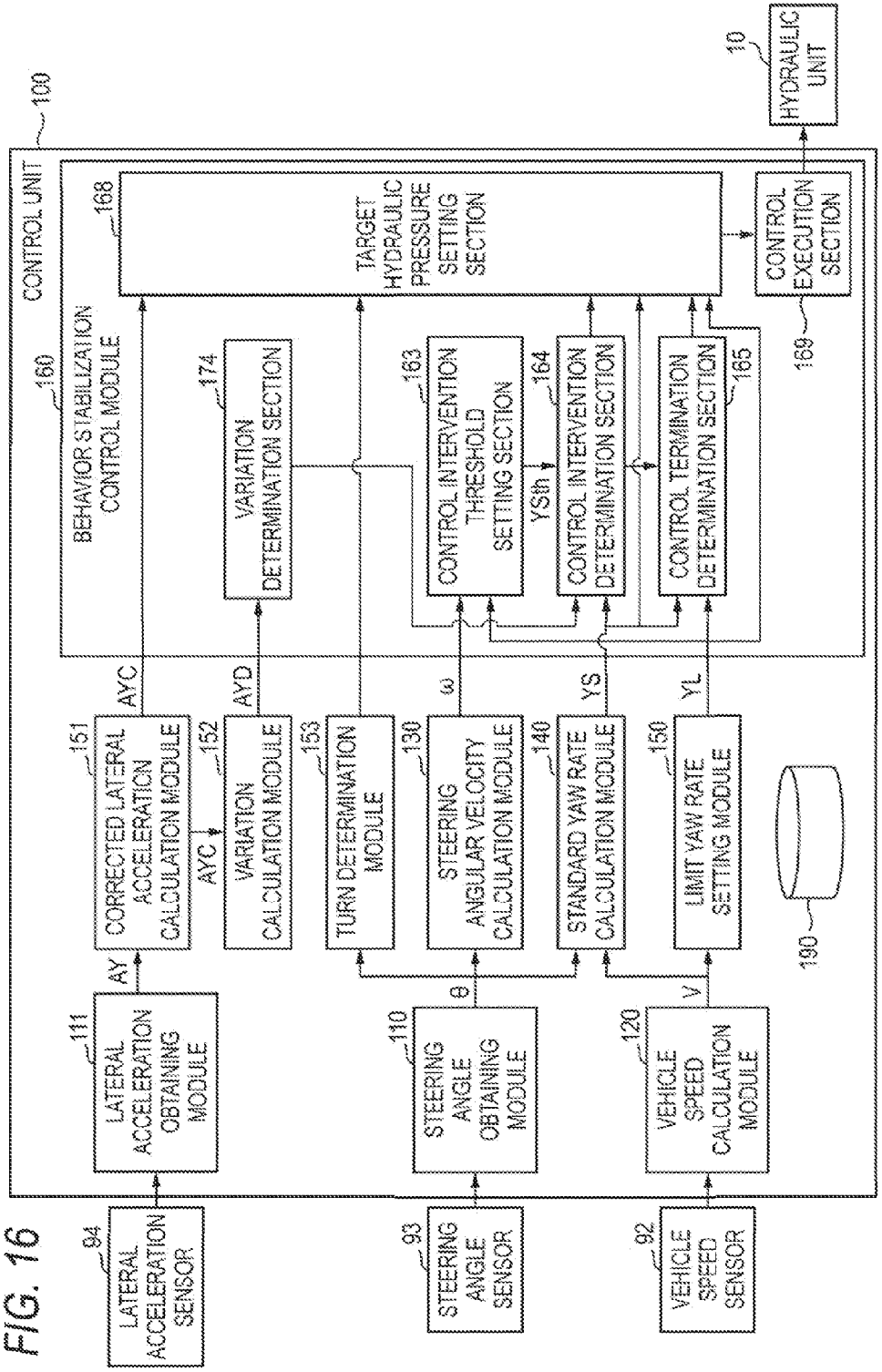
FIG. 16 is a block diagram showing a control unit of a modified example.
Figure 17:
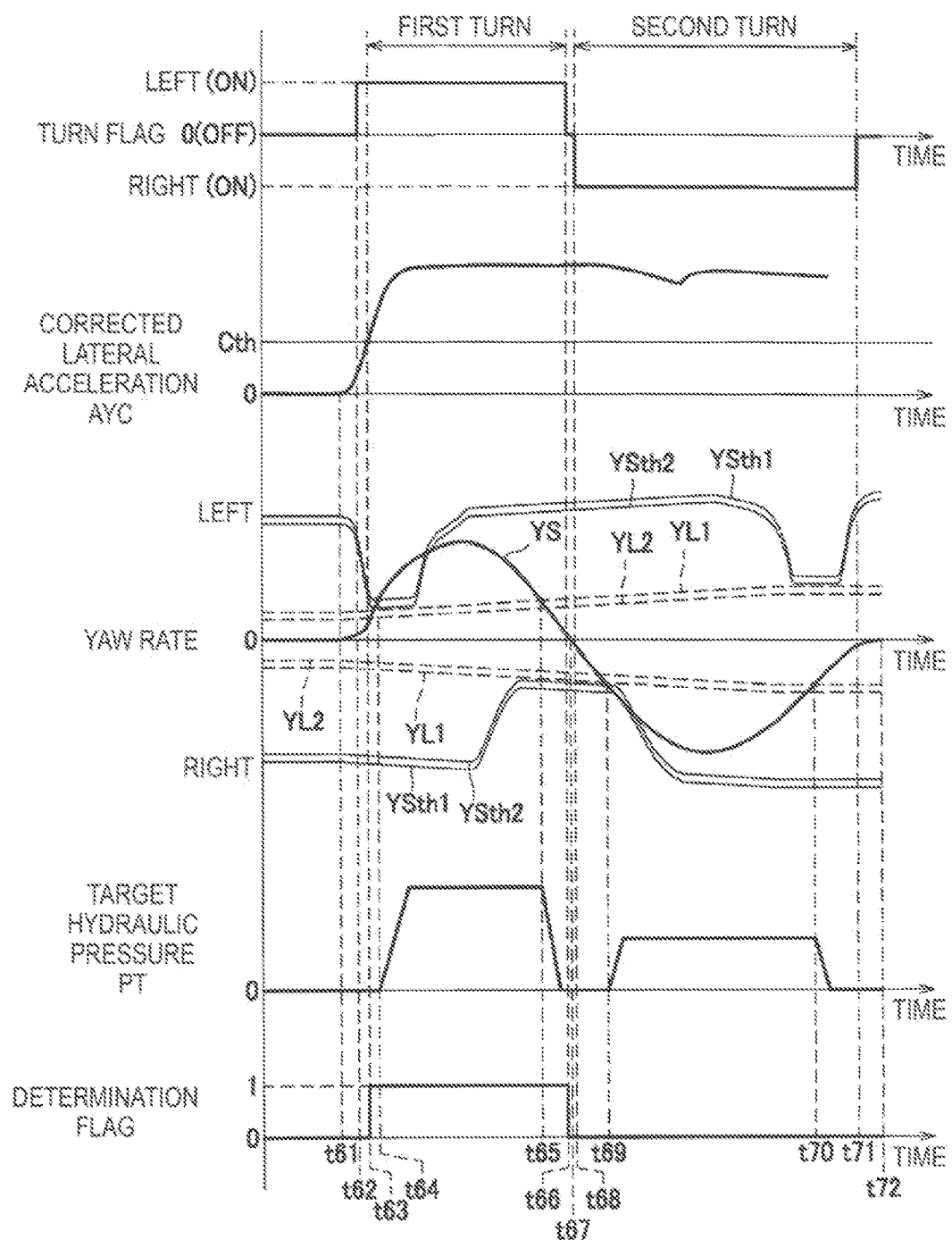
FIG. 17 is a timing chart for describing a determination of turn in the modified example that shows changes in corrected lateral acceleration, several yaw rates, target hydraulic pressure and several flags.

For example, as shown in FIG. 16, the configuration of the control unit 100 can be modified as shown in FIG. 16 so that the control unit 100 includes a turn determination module 153. This turn determination module 153 sets a turn flag on to determine that the vehicle is turning when the steering angle θ exceeds a predetermined value (a turn determination threshold) and sets the turn flag off to determine that the vehicle is not turning when the steering angle θ is equal to or smaller than the predetermined value. As shown in FIG. 17, when the turn flag is on (when the turn determination module 153 determines that the vehicle is turning), the target hydraulic pressure setting section 168 sets a determination flag to 1 from 0 in case the corrected lateral acceleration AYC changes from a value that is smaller than a determination threshold Cth as an example of a third determination threshold to a value that is equal to or larger than the determination threshold Cth as shown at a time t63. Thereafter, when the turn flag becomes off (the turn determination module 153 determines that the vehicle is not turning), in case the determination flag is 1, the target hydraulic pressure setting section 168 sets the determination flag to 0 as shown at a time t66. As this occurs, the target hydraulic pressure setting section 168 determines that the turn that is made in case the determination flag is 1 when the turn flag is on is a first turn and that the turn that is made in case the determination flag is 0 when the turn flag is on is a second turn.

According to this configuration, as shown over a time period from t61 to t67, while the vehicle is turning, which sets the turn flag on, when the corrected lateral acceleration AYC changes from a value that is smaller than a determination threshold Cth to a value that is equal to or larger than the determination threshold Cth at the time t63, the determination flag is reset from 0 to 1, and the target hydraulic pressure setting section 168 determines that the turn that is being made then is a first turn. In case the corrected lateral acceleration AYC does not change from a value that is smaller than the determination threshold Cth to a value that is equal to or larger than the determination threshold Cth during the turn which resets the turn flag on as shown over a time period from t67 to t72 after the turn flag is set off at the time t66 and the determination flag is set to 0 from 1, the determination flag does not change to remain at 0. Therefore, the target hydraulic pressure setting section 168 determines that the turn that is being made then is a second turn.

Then, in the case of the first turn, the behavior stabilization control is started when the standard yaw rate YS becomes larger than the first control intervention threshold YSth1 at the time t64, and a target hydraulic pressure PT is set based on the map MP1 in FIG. 6. Then, the termination process is executed after the standard yaw rate YS becomes smaller than the first limit yaw rate YL1 at the time t65. In the case of the second turn, the behavior stabilization control is started when the standard yaw rate YS becomes larger than the second control intervention threshold YSth2 at the time t69, and a target hydraulic pressure PT that is smaller than that set for the first turn is set based on the map MP2 in FIG. 6. Then, the termination process is executed after the standard yaw rate YS becomes smaller than the second limit yaw rate YL2 at the time t70.

In the embodiment, the behavior stabilization control module 160 is configured so as to start the behavior stabilization control more easily for the second turn than for the first turn. Specifically, the behavior stabilization control module 160 is configured so as to set the two types of thresholds, that is, the control intervention threshold YSth as a control starting threshold and the limit yaw rates YL as a control terminating threshold for each of the first turn and the second turn. However, the invention is not limited thereto. For example, the behavior stabilization control module may be configured so as to set one control starting threshold and one control terminating threshold for the first and second turns so that the start and termination of the behavior stabilization control are determined by the same thresholds for the first and second turns.

In the embodiment, while the target hydraulic pressure is set as the example of the target braking force, a target braking force itself may be set as a target value.

In the embodiment, while the target hydraulic pressure PT is set equally for the turning outer wheels without being differentiated for the front wheel and the rear wheel, target hydraulic pressures PT may be set which are adjusted for the front and rear wheels according to loads borne by the front and rear wheels.

In the embodiment, the vehicle behavior stabilization control is exemplified. However, the vehicle behavior control system A may be configured to also perform an anti-lock braking control.

In the embodiment, the brake system in which the hydraulic pressure produced in the master cylinder MC is transmitted to the wheel cylinders H is exemplified. However, the vehicle behavior control system A may also be applied to a brake system utilizing a so-called brake-by-wire in which a braking force is produced by pressurizing a brake fluid by a motor.

The invention claimed is:
1. A vehicle behavior control system comprising:
a behavior stabilization control module configured to execute a behavior stabilization control so as to stabilize a behavior of a vehicle by giving a braking force to a turning outer wheel of the vehicle based on a target braking force, wherein the behavior stabilization control module has
a target braking force setting section configured to set the target braking force smaller for a second turn than for a first turn, the first turn being a turn occurring first, the second turn being an other turn than the first turn.

2. The vehicle behavior control system of claim 1, comprising:
a lateral acceleration obtaining module configured to obtain a lateral acceleration;
a corrected lateral acceleration calculation module configured to calculate a corrected lateral acceleration so as to increase following an increase of an absolute value of the lateral acceleration and so as not to decrease in response to a decrease of the absolute value of the lateral acceleration;
a variation calculation module configured to calculate a variation in the corrected lateral acceleration;
a steering angle obtaining module configured to obtain a steering angle;
a vehicle speed obtaining module configured to obtain a vehicle speed; and
a standard yaw rate calculation module configured to calculate a standard yaw rate of the vehicle based on the vehicle speed and the steering angle,
wherein the target braking force setting section determines
that the first turn occurs in case the variation in the corrected lateral acceleration is equal to or larger than a first determination threshold when the standard yaw rate exceeds a second determination threshold and the behavior stabilization control is started, and
that the second turn occurs in case the variation in the corrected lateral acceleration is smaller than the first determination threshold when the standard yaw rate exceeds the second determination threshold and the behavior stabilization control is started.

3. The vehicle behavior control system of claim 1, comprising:
a lateral acceleration obtaining module configured to obtain a lateral acceleration;
a corrected lateral acceleration calculation module configured to calculate a corrected lateral acceleration so as to increase following an increase of an absolute value of the lateral acceleration and so as not to decrease in response to a decrease of the absolute value of the lateral acceleration;
a steering angle obtaining module configured to obtain a steering angle; and
a turn determination module configured to determine
that the vehicle is turning when the steering angle exceeds a turn determination threshold, and
that that the vehicle is not turning when the steering angle is equal to or smaller than the turn determination threshold,
wherein the target braking force setting section
sets a determination flag from 0 to 1 in case the corrected lateral acceleration changes from a value that is smaller than a third determination threshold to a value that is equal to or larger than the third determination threshold when the turn determination module determines that the vehicle is turning, and
sets the determination flag to 0 in case the flag is 1 when the turn determination module determines that the vehicle is not turning, and wherein the target braking force setting section determines
that the first turn occurs when the turn determination module determines that the vehicle is turning while the determination flag is set to 1, and
that the second turn occurs when the turn determination module determines that the vehicle is turning while the determination flag is set to 0.

4. The vehicle behavior control system of claim 1,
wherein the behavior stabilization control module starts the behavior stabilization control more easily for the second turn than for the first turn.

5. The vehicle behavior control system of claim 1,
wherein an occurrence of an understeer condition is restricted during the vehicle behavior control for the second turn by setting the target braking force smaller for the second turn than for the first turn.

6. The vehicle behavior control system of claim 1, comprising:
a steering angle obtaining module which obtains information on a steering angle $\theta$ for each control cycle from a steering angle sensor,
the steering angle $\theta$ is outputted to a steering angular velocity calculation module and standard yaw rate calculation module, and
the standard yaw rate calculation module calculates a standard yaw rate YS as a yaw rate based on the steering angle $\theta$ and vehicle speed.

7. The vehicle behavior control system of claim 6, comprising:
a lateral acceleration obtaining module which obtains information on lateral acceleration AY for each control cycle from a lateral acceleration sensor,
a steering angular velocity calculation module which calculates a steering angular velocity $\omega$ from the steering angle $\theta$, and
the steering angular velocity $\omega$ is obtained by differentiating the steering angle $\theta$ or calculating a difference between a previous steering angle $\theta_{n-1}$ and a latest steering angle $\theta_n$.

8. The vehicle behavior control system of claim 7, comprising:
a limit yaw rate setting module which sets a limit yaw rate YL that enables the vehicle to be driven stably based on the vehicle speed and a road surface friction coefficient,
a first limit yaw rate YL1 and a second limit yaw rate YL2 being set for the limit yaw rate YL, and two right and left turn values for each of the limit yaw rates YL1, YL2 being calculated,
the second limit yaw rate YL2 being calculated by using the road surface friction coefficient of a value that is made smaller than the first limit yaw rate YL1 by a predetermined ratio, and making an absolute value of the second limit yaw rate YL2 smaller than an absolute value of the first limit yaw rate YL1, and
the limit yaw rates YL1, YL2 being set so as to take smaller values as the vehicle speed becomes faster.

9. The vehicle behavior control system of claim 8, comprising:
a corrected lateral acceleration calculation module which calculates a corrected lateral acceleration AYC that is a value resulting from filtering a lateral acceleration AY, and
the corrected lateral acceleration AYC is changed so as to be smaller than a previous value within a range of a predetermined variation such that when an absolute value |AY| increases, the corrected lateral acceleration AYC takes a same value as that of the absolute value |AY| so as to increase as the absolute value |AY| increases, whereas when the absolute value |AY| decreases, the corrected lateral acceleration AYC takes a value that is made difficult to decrease.

10. The vehicle behavior control system of claim 9, comprising:
a behavior stabilization control module which executes a behavior stabilization control that stabilizes the behavior of the vehicle CR by giving a braking force to the turning outer wheels of the vehicle CR based on the target braking force, and
the behavior stabilization control module includes a control intervention threshold setting section, a control intervention determination section, a control termination determination section, a variation determination section, a target hydraulic pressure setting section as an example of a target braking force setting section, and a control execution section.

11. The vehicle behavior control system of claim 10, wherein the control intervention threshold setting section sets a control intervention threshold YSth based on the limit yaw rate YL and the steering angular velocity w.

12. The vehicle behavior control system of claim 10, wherein a first control intervention threshold YSth1 is calculated by adding an offset amount YD that is dependent on an absolute value of the steering angular velocity ω to the first limit yaw rate YL1, and
wherein a second control intervention threshold YSth2 is calculated by adding the offset amount YD to the second limit yaw rate YL2, and
wherein the offset amount YD is made to stay at a constant value YD1 until the absolute value of the steering angular velocity ω reaches a predetermined value ω1 from 0 while made to decrease as the absolute value of the steering angular velocity ω increases until the absolute value of the steering angular velocity ω reaches a predetermined value ω2 from the predetermined value ω1.

13. The vehicle behavior control system of claim 12, wherein in a range larger than the predetermined value ω2, the offset amount YD is made to stay at a constant value YD2 that is smaller than YD1, and
wherein the absolute value of the second limit yaw rate YL2 is smaller than the absolute value of the first limit yaw rate YL1, and the absolute value of the second control intervention threshold YSth2 takes a smaller value that the absolute value of the first control intervention threshold YSth1.

14. The vehicle behavior control system of claim 13, wherein the variation determination section determines whether or not a lateral acceleration variation A YD is equal to or larger than a variation threshold AYth that is an example of a first determination threshold.

15. The vehicle behavior control system of claim 14, wherein the control intervention determination section deter lines that the behavior stabilization control be started in case an absolute value of the standard yaw rate YS exceeds an absolute value of the control intervention threshold YSth.

16. The vehicle behavior control system of claim 15, wherein in case the variation determination section determines that the lateral acceleration variation AYD is equal to or larger than the variation threshold AYth, the control intervention determination section determines that the behavior stabilization control be started when the absolute value of the standard yaw rate YS exceeds the absolute value of the first control intervention value YSth1, and
wherein in case the variation determination section determines that the lateral acceleration variation AYD is smaller than the variation threshold AYth, the control intervention determination section determines that the behavior stabilization control be started when the absolute value of the standard yaw rate YS exceeds the absolute value of the second control intervention threshold YSth2.

17. The vehicle behavior control system of claim 16, wherein when the control intervention determination section determines that the behavior stabilization control be started as a result of the absolute value of the standard yaw rate YS exceeding the absolute value of the first control intervention threshold YSth1, the control intervention determination section changes a control mode M from a non-controlling mode (M=0) to a first turn controlling mode (M=1), and
wherein when the control intervention determination section determines that the behavior stabilization control be started as a result of the absolute value of the standard yaw rate YS exceeding the absolute value of the second control intervention threshold YSth2, the control intervention determination section changes the control mode M from the non-controlling mode (M=0) to a second turn controlling mode (M=2).

18. The vehicle behavior control system of claim 17, wherein the control termination determination section determines that the behavior stabilization control be terminated when the behavior stabilization control is started as a result of the absolute value of the standard yaw rate YS exceeding the absolute value of the first control intervention threshold YSth1, and
wherein the control termination determination section determines that the behavior stabilization control be terminated when the behavior stabilization control is started as a result of the absolute value of the standard yaw rate YS exceeding the absolute value of the second limit yaw rate YL2.

19. The vehicle behavior control system of claim 18, Wherein the target hydraulic pressure setting section sets a target hydraulic pressure PT according to whether the control mode M is the first turn controlling mode (M=1) or the second turn controlling mode (M=2) or a termination processing mode (M=3).

20. The vehicle behavior control system of claim 19, wherein the target hydraulic pressure setting section sets a target hydraulic pressure PT based on the standard yaw rate YS and a deviation ΔY of the limit yaw rate YL so that the target hydraulic pressure PT takes a larger value as the deviation ΔY increases, and
wherein ΔY is calculated so that in the event that an absolute value |YS−YL| of a difference between the standard yaw rate YS and the limit yaw rate YL increases, ΔY takes the value of |YS−YL| as it is, whereas in the event the absolute value |YS−YL| decreases, ΔY holds its previous value.

* * * * *